United States Patent
Cafaro et al.

(10) Patent No.: US 11,418,555 B1
(45) Date of Patent: Aug. 16, 2022

(54) SYSTEMS AND METHODS FOR STREAMING AN APPLICATION VIA OBJECT STORAGE

(71) Applicant: The MathWorks, Inc., Natick, MA (US)

(72) Inventors: Mark A. Cafaro, Cambridge, MA (US); Joseph P. Conti, Newton, MA (US); Johan W. Pereira, Amherst, MA (US)

(73) Assignee: The MathWorks, Inc., Natick, MA (US)

( * ) Notice: Subject to any disclaimer, the term of this patent is extended or adjusted under 35 U.S.C. 154(b) by 9 days.

(21) Appl. No.: 16/944,677

(22) Filed: Jul. 31, 2020

(51) Int. Cl.
| | | |
|---|---|---|
| *H04L 29/06* | (2006.01) | |
| *G06F 8/61* | (2018.01) | |
| *G06F 11/10* | (2006.01) | |
| *G06F 16/11* | (2019.01) | |
| *G06F 16/13* | (2019.01) | |
| *G06F 16/172* | (2019.01) | |

(Continued)

(52) U.S. Cl.
CPC .......... *H04L 65/4069* (2013.01); *G06F 8/61* (2013.01); *G06F 11/1004* (2013.01); *G06F 16/11* (2019.01); *G06F 16/113* (2019.01); *G06F 16/13* (2019.01); *G06F 16/172* (2019.01); *G06F 21/31* (2013.01)

(58) Field of Classification Search
CPC ........ G06F 8/61; G06F 11/1004; G06F 16/11; G06F 16/13; G06F 16/113; G06F 16/172; G06F 21/31; H04L 65/4069
See application file for complete search history.

(56) References Cited

U.S. PATENT DOCUMENTS 8,918,511 B2  12/2014  Gulley et al.
10,824,474 B1 *  11/2020  Kamboj ............... G06F 9/5038
(Continued)

FOREIGN PATENT DOCUMENTS

WO  WO-2016073625 A2 *  5/2016  ............. H04L 67/10
WO  WO-2016185459 A1 *  11/2016  ......... H04L 67/1097

OTHER PUBLICATIONS

Bhardwaj, Ketan, et al., "AppFlux: Taming App Delivery via Streaming," Usenix Conference on Timely Results in Operating Systems 2015 (TRIOS '15), Oct. 3, 2015, pp. 1-14.

(Continued)

*Primary Examiner* — Kostas J Katsikis
(74) *Attorney, Agent, or Firm* — Cesari and McKenna, LLP; Michael R. Reinemann

(57) ABSTRACT

Systems and methods stream an application on a computer system. A compressed archive of an installation directory of the application may be created and stored as a storage object. Two mount points may be established at the computer system. One mount point may provide a window to the storage object holding the compressed archive. The other mount point may present an interface to the installation directory. In response to requests by the application to access files from its installation directory, the systems and methods may retrieve the portion of the compressed archive containing that file from the storage object. The systems and methods may extract, e.g., decompress, the requested file from the retrieved page and serve it at the second mount point. The computer system may then provide the requested file to the application.

22 Claims, 11 Drawing Sheets

(51) Int. Cl.
  *G06F 21/31* (2013.01)
  *H04L 65/61* (2022.01)

(56) References Cited

U.S. PATENT DOCUMENTS

| | | | | |
|---|---|---|---|---|
| 2012/0131146 A1* | 5/2012 | Choi | ................ | H04L 67/1029 709/219 |
| 2015/0178059 A1 | 6/2015 | Lindheimer et al. | | |
| 2017/0318119 A1 | 11/2017 | Zbiljic | | |
| 2018/0198765 A1* | 7/2018 | Maybee | ................ | G06F 3/0607 |
| 2018/0307631 A1 | 10/2018 | Braddy et al. | | |
| 2020/0053185 A1 | 2/2020 | Chen et al. | | |

OTHER PUBLICATIONS

Vangoor, Bharath, et al., "To FUSE or Not to FUSE: Performance of User-Space File Systems," Usenix The Advanced Computing Systems Association, Proceedings of the 15th USENIX Conference on File and Storage Technologies (FAST'17), Santa Clara, CA, USA, Feb. 27-Mar. 2, 2017, pp. 1-15.

"File Systems and FUSE," File Systems and FUSE, retrieved from the Internet: <https://www.cs.cmu.edu/~fp/courses/15213-s07/lectures/15-filesys/index.html>, Mar. 2007, pp. 1-2.

"Introduction to VMware ThinApp," VMware ThinApp 4.0, vmware®, VMware, Inc., Jun. 2008, pp. 1-20.

Lougher, Phillip, and Daniel Baumann, "MKSQUASHFS—Mksquashfs Tool to Create and Append to Squashfs Filesystems," Version 4.2, retrieved from the Internet: <https://manpages.debian.org/jessie/squashfs-tools/mksquashfs.1.en.html>, Jun. 30, 2012, pp. 1-4.

Madden, Brian, "What is App Virtualization? Part 5: Streaming," TechTarget, retrieved from the Internet: <https://searchvirtualdesktop.techtarget.com/opinion/What-is-App-Virtualization-Part-5-Streaming>, Mar. 23, 2016, pp. 1-5.

"MATLAB®: Desktop Tools and Development Environment," MATLAB®, R2020a, The MathWorks, Inc., Version 9.8, Mar. 2020, pp. 1-232.

"MATLAB® Web App Server™: User's Guide," MATLAB®, R2020a, The MathWorks, Inc., Version 1.0, Mar. 2020, pp. 1-60.

Pavlov, Artemiy I., and Marco Cecchetti, "SquashFS HOWTO," SquashFS HOWTO, retrieved from the Internet: <https://www.tldp.org/HOWTO/html_single/SquashFS-HOWTO/>, retrieved from the Internet on Jun. 8, 2020, pp. 1-11.

Shashi, Shashikant, "AWS: How to Mount S3 Bucket on EC2 Linux Instance using IAM Role," retrieved from the Internet: <https://medium.com/tensult/aws-how-to-mount-s3-bucket-using-iam-role-on-ec2-linux-instance-ad2afd4513ef>, Jul. 18, 2019, pp. 1-5.

"Squashfs Binary Format (WIP)," Squashfs Format (WIP), retrieved from the Internet: <https://dr-emann.github.io/squashfs/#:~:text=The superblock is the first,other sections of the archive.&text=The number of seconds (not,(or last appended to).>, retrieved from the Internet on Jun. 8, 2020, pp. 1-10.

"The SquashFS Tools Exposed," SquashFS HOWTO, retrieved from the Internet from <https://www.tldp.org/HOWTO/SquashFS-HOWTO/mksqoverview.html>, retrieved from the Internet on Apr. 30, 2020, pp. 1-3.

* cited by examiner

SYSTEMS AND METHODS FOR STREAMING AN APPLICATION VIA OBJECT STORAGE

BRIEF DESCRIPTION OF THE DRAWINGS

The description below refers to the accompanying drawings, of which.

DETAILED DESCRIPTION OF ILLUSTRATIVE EMBODIMENTS

Figure 1:
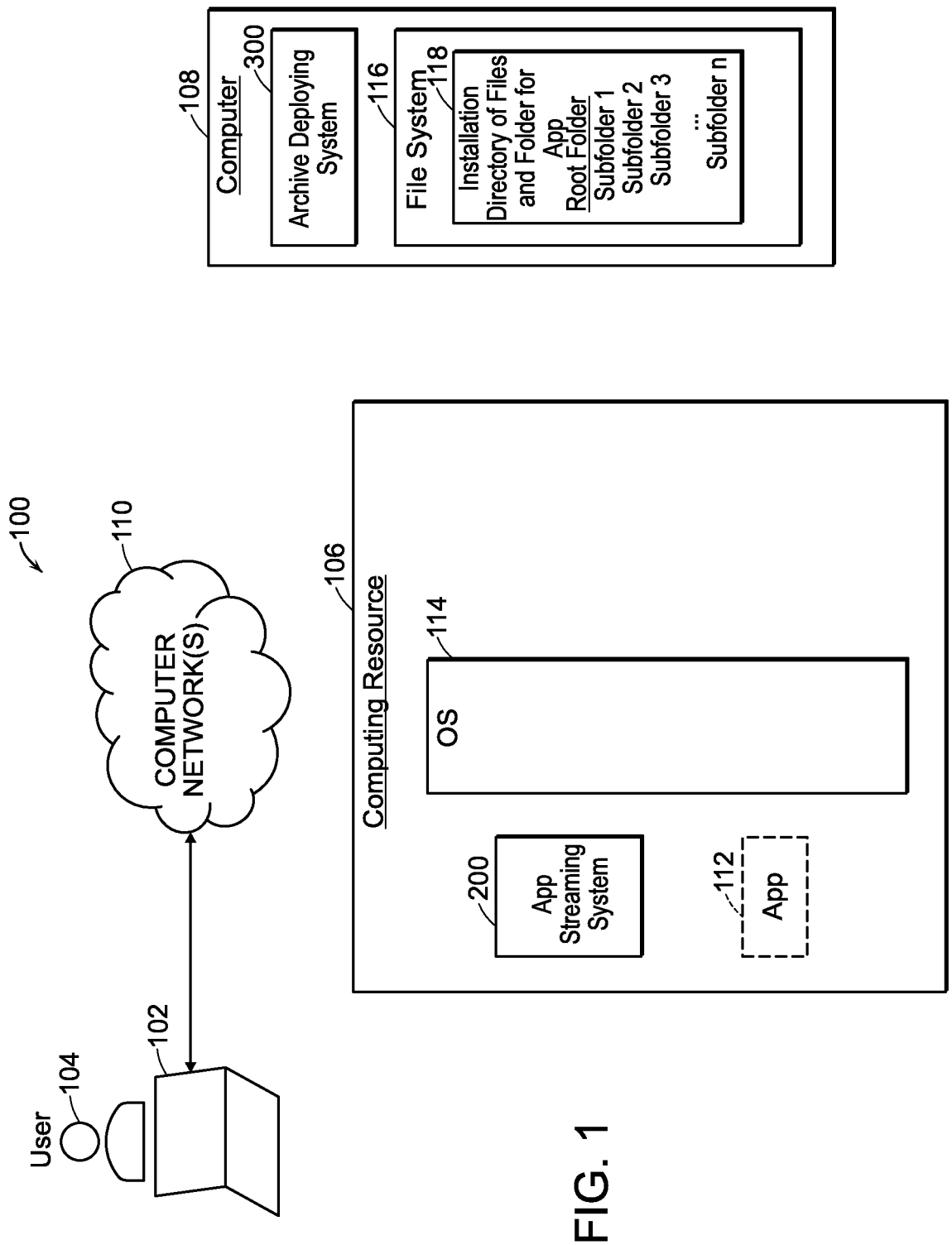
FIG. 1 is a schematic illustration of an example environment in which the systems and methods of the present disclosure may operate in accordance with one or more embodiments.

Large available storage space, e.g., memory or disk space, is often required to install many of today's software application programs, e.g., office productivity application programs, digital media editing application programs, scientific and engineering application programs, etc. For example, the Microsoft Office office suite from Microsoft Corp. of Redmond, Wash. requires approximately 4 GB, the Adobe Premier Pro video editing software from Adobe Inc. of San Jose, Calif. requires approximately 8 GB, the Xcode program development environment from Apple Inc. of Cupertino, Calif. requires approximately 17 GB, the Mathematica technical computing system from Wolfram Research of Champaign, Ill. requires approximately 14 GB, the LabVIEW visual programming environment from National Instruments Corp. of Austin, Tex. requires approximately 10 GB, the CATIA CAD/CAM/CAE software system from Dassault Systèmes SE of Velizy-Villacoublay France requires approximately 120 GB, the AUTOCAD CAD software system from Autodesk, Inc. of Rafael, Calif. requires 40 GB, and the Solid Edge CAD system from Siemens Digital Industries Software of Plano, Tex. requires 16 GB. These application programs (for simplicity, applications) typically install hundreds if not thousands of files typically in a hierarchical directory created in the file system of the machine at which the application is being installed.

Users may desire to run these applications remotely. For example, a user may use a client device to access and execute part of or all of an application installed at a machine different from the client device. Many cloud computing service providers make cloud-based computing resources available to users for rent. For example, Amazon Web Services (AWS) from Amazon.com of Seattle, Wash. offers the Amazon Elastic Compute Cloud (EC2) cloud computing service through which users can rent virtual machines to run applications from a remote client device. Users are typically charged for the time that the they use the computing resource as well as for the processor, memory and disk resources being utilized. Renting a virtual machine with a large amount of storage, e.g., 96 GB or more, costs more than renting a virtual machine with little storage, e.g., 4 GB. As noted, a large amount of disk space may be required to install a scientific or engineering application. It can also take minutes to hours to complete the installation of an application, e.g., due to the size of the application. As a result, it can be costly and inefficient to try and run such applications remotely, e.g., at a cloud-based virtual machine, when the user is paying as he or she goes for that service. This can be especially true when a user only needs a specific, arbitrary portion of the application as well as when the user wants to access such an application repeatedly in separate launches of the cloud-based computing resources. To perform a job or task requested by a user, many cloud services create, e.g., spin up, a cloud-based virtual machine, install the application needed to perform the job or task, and terminate the virtual machine when the job or task is complete. The next time the job or task needs to be performed, the cloud service again creates a virtual machine, installs the application and performs the job or task. Similar installation challenges also arise when using serverless computing platforms, such as the AWS Lambda event-driven, serverless platform from Amazon.com and the Kubernetes open-source container cloud system. With large applications, this restarting of virtual machines and reloading of applications, further increases the costs of using cloud-based virtual machines, rendering it less efficient to do so.

The present disclosure relates to systems and methods for streaming an application and/or a dataset from an object storage service to a computing resource, such as a virtual machine rentable from a cloud service, a platform or function as a service system, a container, which refers to a serverless framework supporting multiple user space instances, or a computer system, among others. Streaming may include installing only the code and files of the application that are necessary as and when they are required, e.g., as a user located remotely from the computing resource performs actions in the application. An installation directory of the files and folders generated during an installation of the application or the dataset may be stored in a file system at a local hard drive of a workstation, a network shared drive, a USB drive, etc. As described, this file system may be located in any number of places. The systems and methods may generate a compressed disk image or archive of the installation directory. The disk image or archive may contain an exact copy of the installation directory, including all of the files of the installation directory as well as its directory and/or file system information. The systems and methods may compute verification data for the compressed archive, such as checksums. For example, the systems and methods may specify a series of offsets through the compressed archive, each defining a portion of the compressed archive. Optionally, the systems and methods may partition the compressed archive into sections. These sections may be referred to as pages, and the systems and methods may compute a checksum for each page of the compressed archive. The compressed archive of the file system, which contains the installation directory of files and folders, and the set of checksums may be converted to storage objects. The systems and methods may store these storage objects in an object container at the cloud service, among other locations. The systems and methods may create the compressed archive and store it as a storage object before a computing resource, such as a virtual machine, is created and/or before a user requests that the application perform a job or task. The creation of the compressed archive and the storing of it as a storage object need only be performed one time.

In response to a user request, e.g., from a client device that may be remote from the computing resource, to run the application on the computing resource, the systems and methods may perform a mock install of the application on the computing resource. The mock install may involve creating two mount points at one or more file systems of the computing platform. The mount points may be empty root directories created at the one or more file systems of the computing resource to which additional file systems may be mounted, e.g., logically attached. These additional file systems can then be accessed from the root directories established by the mount points. For example, the systems and methods may establish a first mount point for the compressed archive of the installation directory. The first mount point may be hidden from the user. The systems and methods may establish a second mount point that provides an interface to the installation directory. The second mount point may be visible to the user. The systems and methods establish the two mount points at the computing resource, making the compressed archive and its contents, e.g., the installation directory, available to the computing resource without having first fully installed either the compressed archive or the installation directory at the computing platform. Instead, the systems and methods may transfer to a file system mounted at the first mount point just a portion, e.g., one or more pages, of the compressed archive, such as metadata indicating locations of files within the compressed archive. The systems and methods may load the storage object containing the set of checksums at the computing resource in order to verify the integrity of the data being transferred to the computing platform via the first mount point. The two mount points may represent windows to other file systems. For example, the first mount point may be a window to the object container at the cloud service, and the second mount point may be a window to the installation directory contained inside the compressed image, which itself may be accessed through the first mount point. With the two mount points established at the computing resource, the systems and methods may notify the user that the application has been installed.

The user may then run the application. As it executes on the computing resource, e.g., in response to user interaction or an event, the application may access particular information, e.g., files, from the installation directory. Following the mock installation, the application or the computing resource may request access to the files in order to perform functionality requested by the user. For example, in response to the user opening the application, the application may access a binary or executable file, such as application.exe, from the installation directory. Because the requested file, application.exe, is not present at the installation directory attached to the second mount point, a request for the file may be made of the compressed archive attached to the first mount point. That is, the requested file, application.exe, may be realized at the computing resource by looking through the two windows represented by the first and second mount points. More specifically, the systems and methods may determine which page of the compressed archive includes the requested file and may retrieve the page from the storage object at the object container. For example, the systems and methods may determine the data blocks from the compressed archive that contain the requested file, and then determine the page(s) of the compressed archive that contain those data blocks. The systems and methods may utilize the checksum computed for the page to check the page's validity. The systems and methods may extract, e.g., decompress, the requested file from the retrieved page and serve it at the file system mounted to the second mount point. The computing resource may then provide the requested file, application.exe, to the application. As the application continues to request access to additional files or portions thereof from the installation directory based on or triggered by user needs, the systems and methods may retrieve the pages of the compressed archive containing those files or portions thereof, extract the files or portions thereof from the retrieved pages, and serve the extracted files or portions thereof at the file system mounted to the second mount point for access by the application. The specific files or portions retrieved, extracted, and served at the computing resource during the streaming of the application to the computing resource may depend on how the user interacts with the application. For example, it may depend on the particular functionality that the user requests the application to perform. The streaming of the application may thus vary from one user to the next and between different interactions with the application by a given user.

With the systems and methods of the present disclosure, utilization of the application running on the computing resource may proceed immediately without the user having to wait for the entire installation directory of files and folders to be installed at the computing resource. Furthermore, as only the application code and/or files needed to carry out user-initiated interactions with application are served on the computing resource, the application's disk footprint at the computing resource is reduced to a fraction of what would otherwise be required by a regular, full installation of the application. In some embodiments, previously loaded code and/or files of the application, e.g., for different use purposes, may be evicted in response to loading additional, e.g., new code and/or files, thereby maintaining a reduced disk footprint for the application at the computing resource. The two mount points implemented by the systems and methods allow the compressed archive to be streamed to the computing resource as the application is executing. The present disclosure also significantly reduces the number of network requests that might otherwise be required if the application was transferred to the computing resource file-by-file, because the application may be transferred in pages containing one or more compressed files, not by file. The present disclosure thus reduces network overhead. The present disclosure also reduces the amount of processor overhead dedicated to checksum verification, because it verifies pages rather than each individual file. Furthermore, because the compressed archive can represent a pre-existing regular, full installation of the application that may include all of the application's available tools and/or toolboxes and yet only a select subset of those tools or toolboxes may be permitted to be streamed to a given user, the present disclosure may reduce the administrative burden that might otherwise occur when creating and manage numerous installations having different combinations of tools and/or toolboxes.

FIG. 1 is a schematic illustration of an example environment 100 including the systems and methods of the present disclosure in accordance with one or more embodiments. The environment 100 may include a data processing device 102, such as a laptop computer, associated with a user 104, a computing resource 106, and another data processing device, such as a computer 108. In some embodiments, the computing resource 106, e.g., a server or other computer in a cloud (local or public), a platform or function as a service system, a serverless framework, etc., may be remote in the sense of being in a different physical location from the user 104 and not physically accessible by the user 104 or that can only be accessed through another computing device, such as the data processing device 102. The user 104 can, however, control the remote computing resource 106, for example by connecting to the remote computing resource 106 through one or more computer networks indicated at 110, such as one or more data communication networks. Running on the remote computing resource 106 may be an application (app) streaming system 200. In some embodiments, an Operating System (OS) 114 may also be running on the remote computing resource 106. Nonetheless, it should be understood that in some embodiments the remote computing resource 106 may not have an OS. As described, the user 104 may control an application (app) running in-memory on the remote computing resource 106. The app 112, which is included in FIG. 1 for purposes of explanation, is shown in phantom, because it has yet to streamed to the remote computing resource 106.

The computer 108 may include a file system 116. Stored on the file system 116 may be an installation directory of files and folders created during a standard, e.g., normal, installation of the app 112, as indicated at 118. The files and folders may be hierarchically arranged in the installation directory 118. Exemplary files included in the hierarchical installation directory 118 for the app 112 include binaries and/or executables, shared libraries, such as dynamic link library (DLL) files, help files, examples, application resources, such as images and icons, localization text, configuration files, software development kits (SDKs), etc. As described, the laptop computer 102 and the computer 108 may be separate devices, and the computer 108 may not communicate with the laptop computer 102.

In some embodiments, the computer 108 may also include an archive deploying system 300 or at least a portion thereof. The archive deploying system 300 may create one or more archives, translate the archives into storage objects and store the storage objects in one or more object containers.

Figure 2:
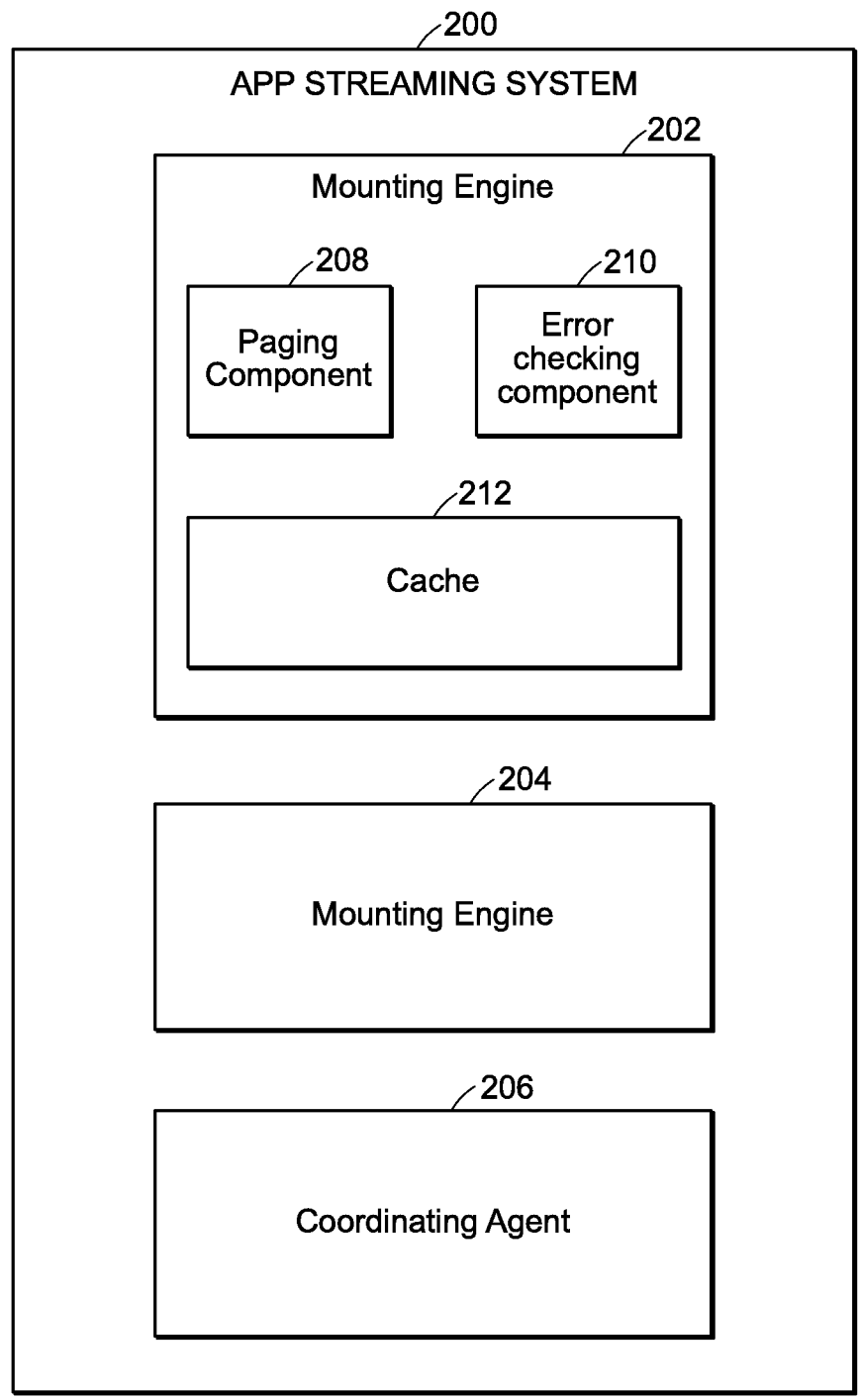
FIG. 2 is a functional diagram of an example of the application streaming system in accordance with one or more embodiments.

FIG. 2 is a functional diagram of an example of the app streaming system 200 in accordance with one or more embodiments. The app streaming system 200 may include a mounting engine 202, a mounting engine 204, and a coordinating agent 206. As described, the mounting engine 202 may be configured to mount one or more storage containers. The mounting engine 204 may be configured to mount one or more file systems and/or directories. The mounting engine 202 may include a paging component 208 configured to retrieve pages of storage objects and an error-checking component 210 configured to check the validity of retrieved pages. The storage container mounting engine 202 also may include or have access to a cache 212, e.g., for caching information from the installation directory 118. The coordinating agent 206 may assist the mounting engines 202 and 204 in fulfilling requests by the user and/or the app 112.

Figure 3:
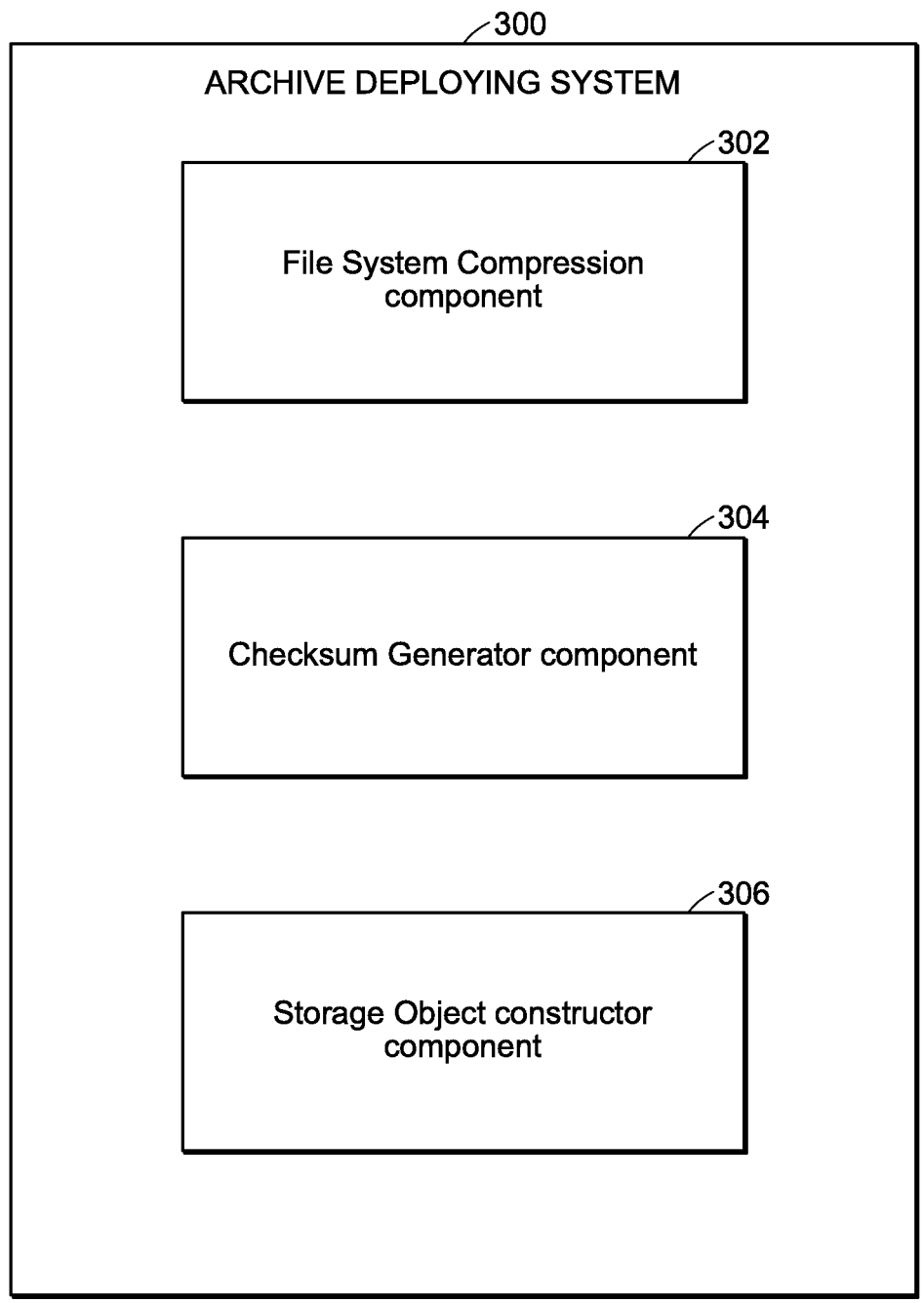
FIG. 3 is a functional diagram of an example of the object storage system in accordance with one or more embodiments.

FIG. 3 is a functional diagram of an example of the archive deploying system 300 in accordance with one or more embodiments. The archive deploying system 300 may include a file system compression component 302 configured to create one or more archives and a checksum generator component 304 configured to compute checksums for the one or more archives. In some embodiments, the archive deploying system 300 may also include a storage object constructor component 306 configured to translate the archives and checksums to objects and store them in one or more object containers.

It should be understood that FIGS. 2 and 3 are meant merely for explanation purposes and that the app streaming system 200 and/or the archive deploying system 300 may take other forms, such as including additional, other, or fewer components. The components may also be distributed in different ways and/or among different entities. Nonetheless, in some embodiments, none of the components or modules of the app streaming system 200 are included on the client device 102.

The mounting engine 202, the mounting engine 204, the coordinating agent 206, the file system compression component 302, the checksum generator component 304, and the storage object constructor component 306 may be implemented through one or more software modules or libraries containing program instructions pertaining to the methods described herein. The software modules may be stored in a memory, such as a main memory, a persistent memory and/or a computer readable media, of a computer, workstation, server, or other data processing machine or device, such as the computing resource 106 and/or the computer 108, and executed by one or more processors. Other computer readable media may also be used to store and execute these program instructions, such as non-transitory computer readable media, including optical, magnetic, or magneto-optical media. In other embodiments, the mounting engine 202, the mounting engine 204, the coordinating agent 206, the file system compression component 302, the checksum generator component 304, and the storage object constructor component 306 and/or one or more of the parts thereof may comprise hardware registers and combinatorial logic configured and arranged to produce sequential logic circuits that implement the methods described herein. In alternative embodiments, various combinations of software and hardware, including firmware, may be utilized to implement the described methods.

The process of preparing the application 112 for streaming to the computing resource 106 may be performed by or at the direction of the creator or provider of the application 112. Nonetheless it may also be performed by other users. As described, the installation directory 118 can be created by performing standard, normal installation of the application 112 at the computer 108, which may be operated by the creator or provider of the application 112. Installation of the application 112 at the computer 108 may be performed by an installer. Installation may include creating the directory structure, which may be a hierarchical directory, creating and/or loading code and/or files, e.g., program files, into the directory structure, adding configuration data, such as configuration files, operating system registry entries, and environment variables, configuring components that run automatically, such as daemons and operating system services, and updating and/or loading device drives.

Figure 4:
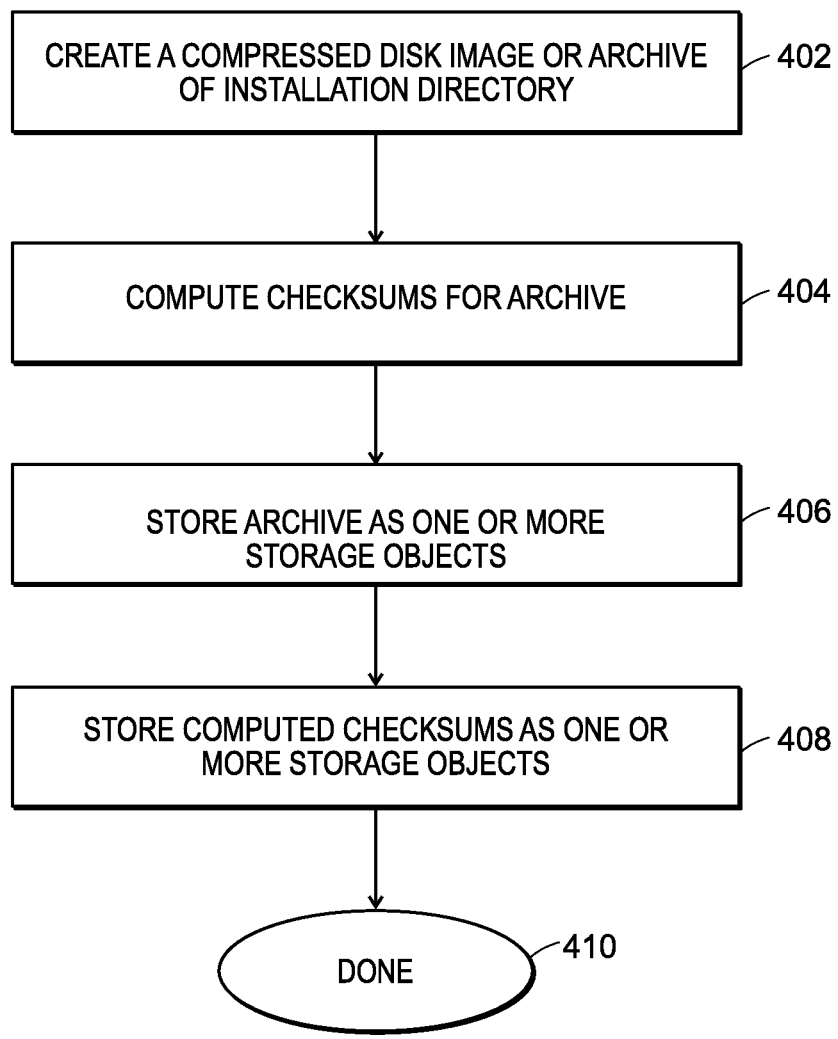
FIG. 4 is a flow diagram of an example method in accordance with one or more embodiments.

FIG. 4 is a flow diagram of an example method in accordance with one or more embodiments. To prepare an application, such as the application 112, for execution remotely from a user device, e.g., a client device, the file system compression module 302 of the archive deploying system 300 may produce a compressed disk image or archive of the installation directory 118 for the application 112, as indicated at step 402. Suitable tools for creating the compressed disk image or archive of the installation directory 118 include the squashfs, cramfs, e2compr for the ext2 file system, and axfs utilities for creating compressed file systems, among others. The squashfs utility, for example, compresses data, inodes, and directories of a source file system, creating a compressed archive of the source file system and outputting the compressed archive in a file or as a block device. To create a squashfs compressed file system, the file system compression module 302 may implement the squashfs utility and may run the command mksquashfs source1 destination [options]
where,
'mksquashfs' is the command name,
'source1' is the source file system, e.g., the installation directory 118,
'destination' is the file name of the compressed archive, and
'[options]' include the command-line options applied by the mksquashfs tool, if any, such as removing duplicate files, enabling file system checks, etc.

In some embodiments, the file system compression module 302 may compress the archive in a manner that optimizes the particular application for streaming. For example, for an engineering or scientific application having hundreds or more files and a large disk footprint, e.g., greater than 6 GB, the file system compression model 302 may apply the Zstandard (zstd) lossless compression algorithm developed by Yann Collet. The zstd algorithm supports a plurality of compression levels, e.g., −5 to 22, and the file system compression module 302 may use level 16. The file system compression module 302 may also not append the compressed archive being created to the existing file system 116. The file system compression module 302 may not compress the inode table or any extended attributes for the installation directory 118. The file system compression module 302 may set the data block size to 262144 bytes. For example, the file system compression module 302 may use the following mksquashfs options:

comp zstd
Xcompression-level 16
noappend
noI
noX
b 262144

Nonetheless, it should be understood that file system compression module may not customize the compression of the installation directory 118, and may instead utilize the default options of the compression utility.

Figure 5:
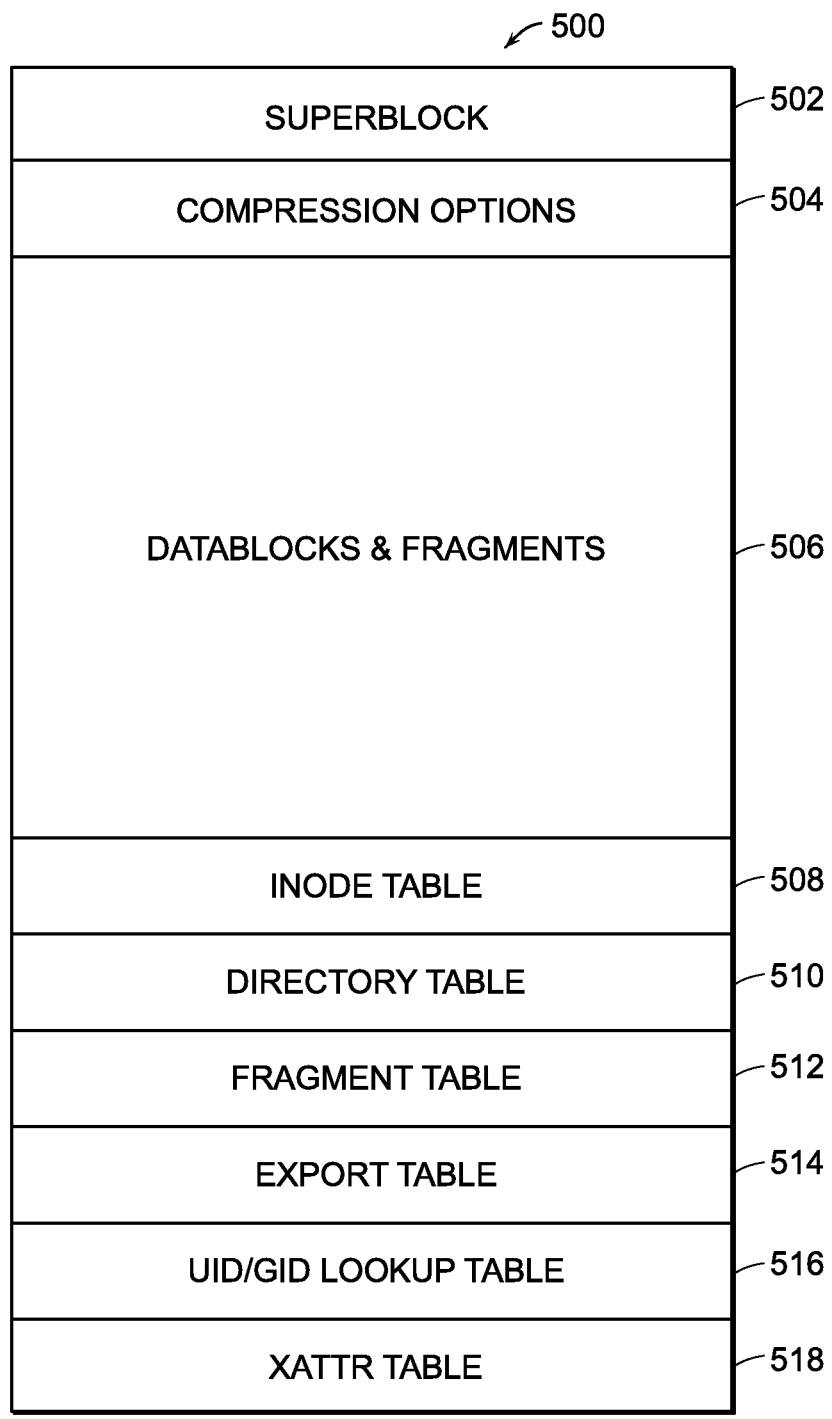
FIG. 5 is a schematic illustration of an example compressed archive of a file system in accordance with one or more embodiments.

FIG. 5 is a schematic illustration of an example compressed file system archive file 500 in accordance with one or more embodiments. The file system archive file 500 may include a plurality of sections or parts. For example, it may include a superblock section 502, which may include information about the archive file 500, such as locations of other parts or sections. The file system archive file 500 may include a compression options section 504, which may indicate the compression options used when the file system archive file 500 was created. It may include a datablocks and fragments section 506, which may contain the contents, e.g., data, of the files from the installation directory 118 split into blocks and compressed. As described, this data may include binaries, shared libraries, documentation, icons, etc. Each file's data may be stored in a number of data blocks sequentially stored in the datablocks and fragments section 506. The superblock section 502 may also provide locations of files within the datablocks and fragments section 506. The file system archive file 500 may include an inode table section 508, which contains the inodes from the installation directory 118 compressed into metadata blocks. It may include a directory table section 510, which contains the directories from the installation directory 118 compressed into metadata blocks. The file system archive file 500 may include a fragment table section 512, which contains information describing the location and size of fragment blocks as compressed metadata blocks. It may include an export table section 514, which contains information for exporting the file system archive file 500, such as an inode number to inode disk location lookup table to support NFS exports, as compressed metadata blocks. The file system archive file 500 may include a User Identifier/Group Identifier (UID/GID) lookup table section 516, which may contain user and group permissions as compressed metadata blocks. The file system archive 500 may include an Extended Attributes (Xattr) table section 518, which contains extended attributes if any for the inodes, as compressed metadata blocks.

It should be understood that FIG. 5 is intended for explanation purposes only and that the compressed archive may have other formats. For example, other compression utilities may be used resulting in different archive formats. Other compression utilities include the MagicISO disk image utility from MagicISO, Inc., the Virtual Hard Disk (VHD) file format from Microsoft Corp., and ISO 9660 file system image format, among others.

In addition, some file systems may use other structures besides inodes to identify blocks containing file data. For example, the NT File System (NTFS) from Microsoft Corp. of Redmond, Wash. uses File Identifiers (IDs), which may be included in a Master File Table (MFT) of the NTFS. The app streaming system 200 may retrieve the portion of the file system image that contains the information identifying file data locations, e.g., the MFT. The app streaming system 200 may store the MFT on the virtual machine. The block ids of the block(s) storing the file data of a requested file or portion thereof may be determined from the information in the MFT. The app streaming system 200 may translate the block ids to page numbers and may retrieve the page(s) containing the block(s) storing the file data of the requested file or portion thereof. Other file systems may utilize different structures besides inodes and File IDs and the app streaming system 200 may be configured to utilize these structures.

Returning to FIG. 4, the checksum generator component 304 may compute a set of checksums for the file system archive file 500, as indicated at step 404. In some embodiments, the checksum generator component 304 may compute checksums for a sequence of adjoining and non-overlapping portions of the file system archive file 500, which may be referred to herein as pages. In some embodiments, the archive deploying system may at least logically partition compressed archive 500 into pages, and the checksum generator component 304 may compute a checksum for each page. The pages may be of uniform size or they may vary in size. Instead of physically partitioning the compressed archive 500 into pages, the pages may be logically identified by a series of offsets through the archive file 500. In some embodiments, the checksum generator component 304 may choose a size, e.g., X, of the pages based on the size of the installation directory 118 that was compressed. The checksum generator component 304 may compute a checksum for every X bytes of the compressed archive 500. For example, the size of the pages may be on the order of $1/1000$ of the size of the installation directory 118. If the installation directory 118 is 30 GB, the pages may be 30 MB as illustrated below:

| Offset | Checksum |
|--------|----------|
| 0 MB   | Checksum1 |
| 30 MB  | Checksum2 |
| 60 MB  | Checksum3 |
| 90 MB  | Checksum4 | etc.

In some embodiments, the checksum generator component 304 may apply the 32-bit cyclic redundancy check (CRC-32) checksum algorithm. Nonetheless, it should be understood that other checksum algorithms may be used, such as Adler-32, MD5, SHA-1, SHA-2, SHA-3, etc. The checksum generator component 304 may store the set of checksums, e.g., as a list, in one or more files.

The term pages as used herein in connection with the compressed file system archive 500 should not be confused with the pages of a virtual memory space defined by an operating system.

In some embodiments, the archive deploying system 300 utilize usage statistics associated with the app 112 to determine a partitioning strategy that improves application streaming throughput. For example, the creator or provider of the app 112 may collect information on the frequency of which files or portions thereof from the installation directory are accessed by users when running the app 112. The app creator or provider may evaluate this information and determine that a significant number of users often access the same set of files, such as particular DLLs, help files, etc. The app creator or provider may apply a partitioning strategy that associates these frequently accessed files with one page or with just a small number of pages, instead of allowing these files to be distributed across many pages. For example, the frequently used files or portions thereof may be placed in a single page. This may reduce network requests for pages during execution of the app 112. In particular, in response to a first request for one of these files, the page may be accessed and cached at the computing resource 106. Subsequent requests for these files may be serviced from the cache instead of issuing network requests for additional pages.

In some embodiments, the storage object constructor component 306 may translate and/or save the compressed file system archive file 500 as an object of an object storage system, as indicated at step 406. The storage object constructor component 306 may similarly translate and/or save the file containing the set of checksums as an object, as indicated at step 408. For example, the storage object constructor component 306 may generate metadata and unique identifiers (IDs) for the compressed file system archive file 500 and for the file containing the set of checksums. The storage object constructor component 302 may store the metadata with the compressed file system archive file 500 and the file containing the set of checksums as objects. In some embodiments, the storage object constructor component 306 may store the objects in a container at an object storage service, which may be a cloud-based service. This may complete the creation of the compressed file system archive file, as indicated at done block 410.

It should be understood that the flow diagrams described herein are representative only. In some embodiments, one or more steps may be omitted, one or more steps may be optionally performed, multiple steps may be combined or consolidated, additional steps may be added, the order of steps may be changed, and/or one or more sequences as indicated by the arrows of the flow diagram may be omitted, among other alternatives.

Figure 6:
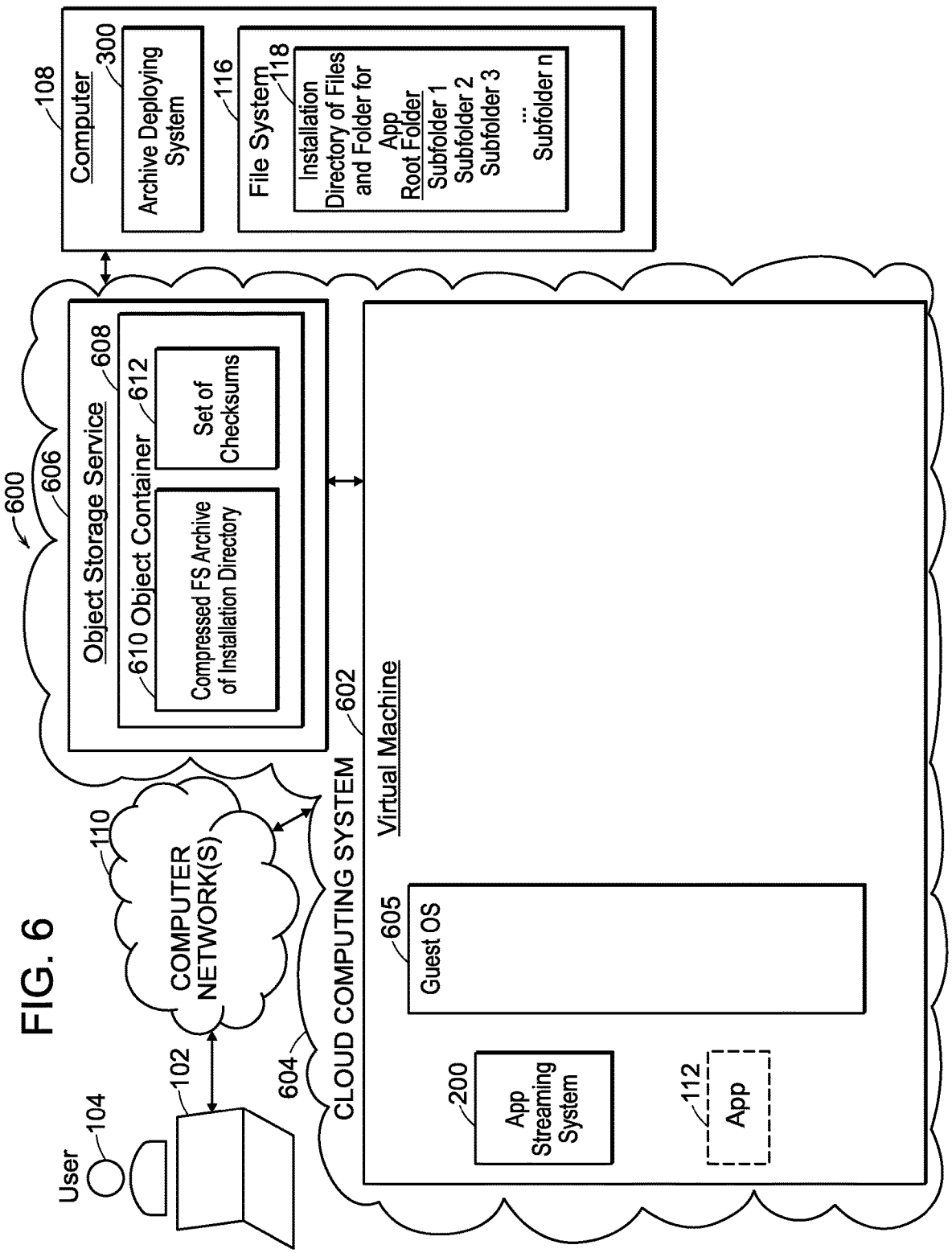
FIG. 6 is a schematic illustration of an example environment in which the systems and methods of the present disclosure may operate in accordance with one or more embodiments.

FIG. 6 is a schematic illustration of an example environment 600 including the systems and methods of the present disclosure in accordance with one or more embodiments. The environment 600 includes the data processing device 102 operated by the user 104 and the computer 108. Here, the computing platform illustrated in FIG. 1 is implemented as a virtual machine 602 of a cloud computing system 604. For example, the cloud computing system 604 may provide computing resources, such as processor, memory, disk storage, and other hardware or software resources to users or user devices, such as the user 104 or the device 102, and may create the virtual machine 602 in response to a request from the user 104 to run the app 112. The cloud computing system 604 may include a host machine having a virtualization layer that establishes and manages one or more virtual machines. The virtualization layer may be implemented as a hypervisor. Each virtual machine may be a separate execution environment on which a guest Operating System (OS) and one or more applications may be run, such as guest OS 605, the app 112, and the app streaming system 200.

The cloud computing system 604 may also include an object storage service 606 that includes an object container 608. The object container 608 includes a storage object 610 that includes the compressed file system archive 500 and another storage object 612 that includes the computed checksums.

Exemplary cloud computing systems include the Amazon Web Services (AWS) cloud computing system from Amazon.com, the Microsoft Azure cloud computing system from Microsoft Corp., and the Google Cloud cloud computing system from Google, among others, as well as private cloud computing systems, such as enterprise clouds.

Exemplary virtual machines include the compute instances of the Amazon Elastic Compute Cloud (EC2) from Amazon.com, the virtual machines of the Microsoft Azure cloud computing system, and the compute engine instances of the Google Cloud cloud computing system, among others.

As illustrated, the object storage service 606 may be hosted by the same cloud computing system 604 that hosts the virtual machine 602. In this case, the storage object constructor component 306 may be a service or utility provided by the cloud computing system 604. For example, the compressed file system archive file 500 and the computed checksums may be uploaded from the computer 108 to the cloud computing system 604, which may store them as objects in one or more containers provided by the object storage service 606. As described, the computer 108 with the installation directory 118 may be operated and/or controlled by the creator or provider of the app 112. The computer 108 may be a separate device from the client device 102 and from the cloud computing system 604. Nonetheless, it should be understood that the object container 608 may be stored at an object storage service of a different computing system, e.g., a different cloud computing system, than the one hosting the virtual machine 602.

Suitable object storage services include cloud-based object storage, such as Amazon Web Services S3, Microsoft Azure Blob Storage, and Google Cloud Storage, and on-premise, self-hosted object storage, such as OpenStack Object Storage (Swift), MinIO cloud storage from MinIO, Inc. of Palo Alto, Calif., IBM Cloud Object Storage from IBM, and the HyperStore object storage environment from Cloudian, Inc. of San Mateo, Calif.

Figure 7:
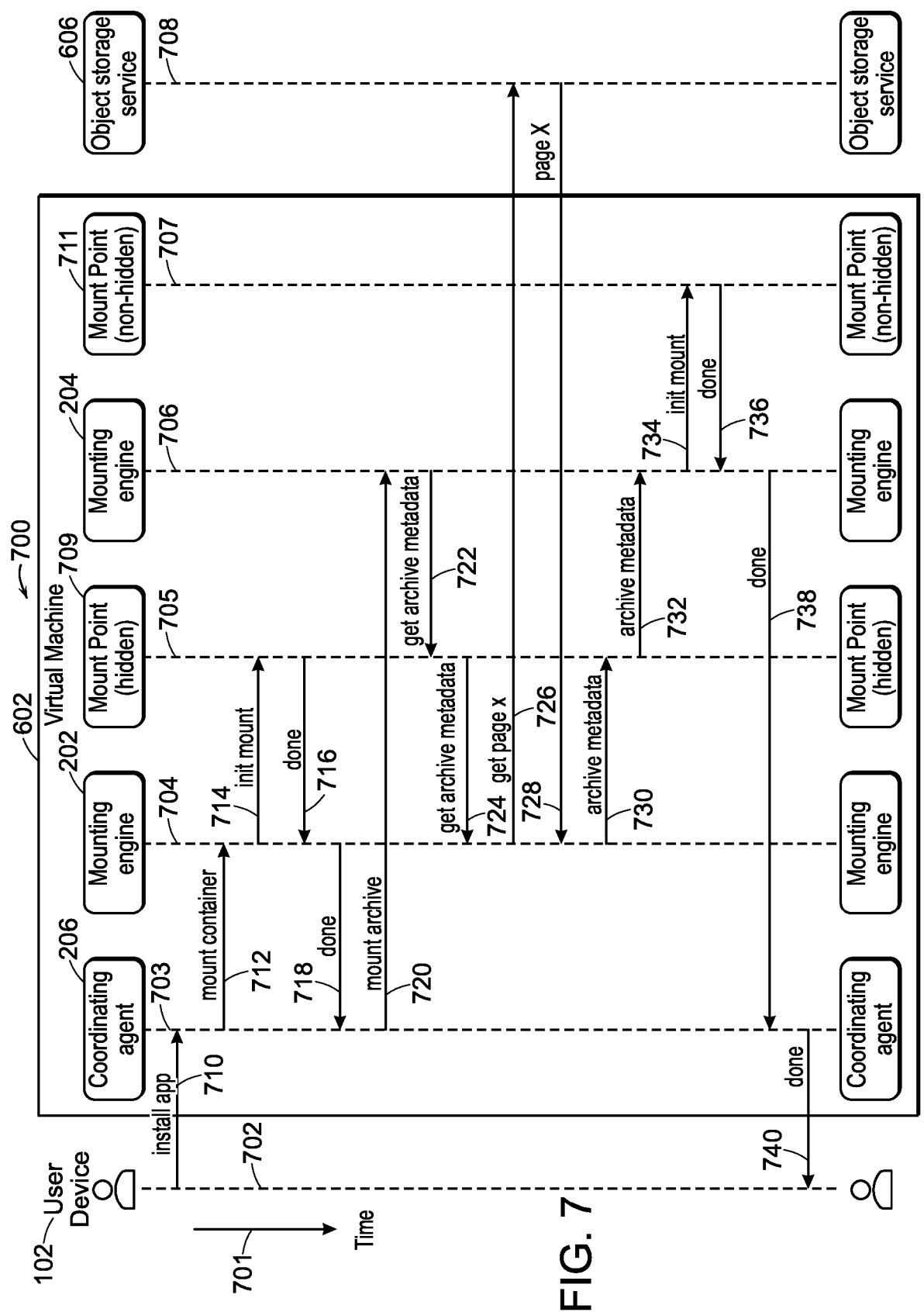
FIG. 7 is an example sequence diagram in accordance with one or more embodiments.

FIG. 7 is an example sequence diagram 700 illustrating example interactions involved in a streaming installation of the app 112 at the virtual machine 602 in accordance with one or more embodiments. It should be understood that the sequence diagrams described herein are representative only. In some embodiments, one or more interactions may be omitted, one or more interactions may be optionally performed, multiple interactions may be combined or consolidated into a single interaction, additional interactions may be added, and/or the order of interactions may be changed, among other changes.

The sequence diagram 700 includes a plurality of lifelines representing processes and a plurality of arrows representing interactions among the processes over time as indicated by time arrow 701. The interactions may be synchronous or asynchronous messages, calls, or commands. For example, the sequence diagram 700 may include seven lifelines 702-708 representing the client device 102 operated by the user 104, the coordinating agent 206 of the app streaming system 200, the storage container mounting engine 202, a mount point 709 of a first file system of the virtual machine 602, the file system mounting engine 204, a second mount point 711 of a second file system of the virtual machine 602, and the object storage service 606, respectively. The lifeline 702 for the user 104 may represent a process, such as a client service or agent, running at the laptop computer 102 or another user device or client device. The lifelines 703-707 may represent processes running at the virtual machine 602. The lifeline 708 may represent a process running at the object storage service 606. In some embodiments, as described, the file systems at the virtual machine 602 may each be implemented as a Filesystem in User Space (FUSE).

After requesting that the cloud computing system 604 create the virtual machine 602, the user 104 may request that the app 112 be installed at the virtual machine 602. The request to install the app 112 may be received by the coordinating agent 206 of the app streaming system 200 at the virtual machine 602, as indicated at interaction 710. In some embodiments, the request may specify the app to be installed, e.g., the CATIA CAD/CAM/CAE software system, the version, e.g., release R2018 (R28), which may not necessarily be the most current release, and the location where the user wants the app to be installed, such as a Program Files folder of a file system at the virtual machine 602. The coordinating agent 206 may direct the storage container mounting engine 202 to mount the object container 606 at a hidden mount point at the virtual machine 602, as indicated at interaction 712. As described, the object container 606 includes the object 608 containing the compressed file system archive file and the object 610 containing the set of computed checksums. The storage container mounting engine 202 may initialize a hidden mount point indicated at 709 at the virtual machine 602, as indicated at interaction 714. As described, the hidden mount point 709 may be created to mount a first Filesystem in User Space (FUSE_1) at the virtual machine 602. The hidden mount point 709 and/or the FUSE_1 may indicate to the storage container mounting engine 202 that the hidden mount point 709 has been initialized, as indicated at interaction 716, and the storage container mounting engine 202 may indicate to the coordinating agent 206 that the object container 606 has been mounted, as indicated at interaction 718. While the storage container mounting engine 202 indicates that the object container 606 is mounted at the hidden mount point 709, no compressed application data from the object container 606 has yet been brought over and/or loaded onto to the virtual machine 602 from the object storage service 606. For example, as indicated in the sequence diagram 700, up until this point in time 701, no compressed application data has yet to be transferred by the app streaming system 200 from the object storage service 606. As described, the object container 608 may be created at any time prior to a request for any of the contents of the compressed archive 500, e.g., by a user device, such as the laptop computer 102.

The coordinating agent 206 may direct the mounting engine 204 to mount the installation directory for the app 112 at another, non-hidden mount point indicated at 711 at the virtual machine 602, as indicated at interaction 720. As described, the non-hidden mount point 711 may be created to mount a second Filesystem in User Space (FUSE_2) at the virtual machine. To mount the installation directory, the mounting engine 204 may need metadata of the file system archive file 500. For example, the mounting engine 204 may need the superblock section 502 of the compressed file system archive file 500 to determine how much memory and/or disk space to preallocate at the virtual machine 602 and to determine the size and offset locations of the various parts of the compressed file system archive file 500. According to the squashfs utility, the superblock section 502 of a compressed disk image or archive, such as the compressed archive 500, has a predefined structure, location in the compressed archive 500, and size, and the mounting engine 204 may be configured with this information. As the user 104 interacts with the app 112, the mounting engine 204 may utilize the information from the superblock section 502 to locate other sections of the compressed archive 500, e.g., in response to requests for a listing of files, a file, file attributes, etc. Accordingly, the mounting engine 204 may request the superblock section 502 from the hidden mount point 709 (FUSE_1), as indicated at interaction 722. Accordingly, the hidden mount point 709 (FUSE_1) may request the superblock section 502 from the mounting engine 202, as indicated at interaction 724. The paging component 208 of the mounting engine 202 may issue a call to the object storage service 606 for the page(s), e.g., page X, of the compressed file system archive 500 that includes the superblock section 502, as indicated at interaction 726. The paging component 208 also may be configured with the structure of the archive file 500 and its sections as defined by the squashfs utility. The paging component 208 also may be configured with the offset sizes of the pages. The paging component 208 may utilize this information to identify the pages that contain the superblock section 502. Suppose for example that the superblock section 502 begins at byte 0 and has a size of 35 MB. Suppose also the page sizes are 30 MB. The paging component 208 may issue a call for the first two pages of the compressed archive 500, e.g., pages 0 and 1.

In some embodiments, the paging component 208 and/or the mounting engine 202 of the app streaming system 200 may utilize an object storage container mounting tool or utility for transferring and synchronizing storage objects to retrieve selected pages of the compressed file system archive file 500 from the storage object 610. Exemplary object storage container mounting tools include rclone, an open source software program available on GitHub, which manages files on cloud storage. For example, the paging component 208 may utilize the following command from the rclone tool:

rclone mount remote:path/to/files C:\path\directory [options]

where,

'rclone mount' is the command name,

'remote:path' identifies the storage object, e.g., the object container 608, 'C:\path\directory' identifies the hidden mount point 709 at the virtual machine 602, and '[options]' specify the options for the command.

The object storage container mounting tool, e.g., rclone, may be customized for use by the paging component 208.

For example, the object storage container mounting tool may be customized to include options for specifying the number of pages to transfer with each request to reduce the number of network requests even further and the number of parallel downloads to perform to reduce transfer time.

It should be understood that other object storage container mounting tools may be used besides rclone, such as s3fs from Amazon Web Services for mounting an Amazon S3 bucket, Cloud Storage Fuse (gcsfuse) an open source FUSE adapter for mounting Google Cloud Storage buckets, and the Blobfuse virtual file system driver for Azure Blob storage from Microsoft, among others.

The object storage service 606 may return the requested page, e.g., page X, to the paging component 208 of the mounting engine 202, as indicated at interaction 728. The error-checking component 210 of the mounting engine 202 may use the checksum generated for the requested page, e.g., page X, to check its validity. For example, the error-checking component 210 may compute a checksum for the received page using the same checksum algorithm, e.g., CRC-32. The error-checking component 210 may then check that the checksum it computed matches the checksum for that page as stored in the set of checksums 808. If the error-checking component 210 determines that the received page is valid, e.g., the checksum it computes for the received page matches the stored checksum in the set of checksums 808 for that page, the mounting engine 202 may store the received page in its cache 212. If the error-checking component 210 determines there is an error in the received page, e.g., the checksum it computes does not match the stored checksum, it may request that the page, e.g., page X, be resent by the object storage service 606. This process may be repeated until the error-checking component 210 determines that the received page is valid. The error checking performed on pages by the error-checking component 210 is in addition to any error checking that also may be performed by the network communication protocol stacks at the virtual machine 602 and the object storage service 606 used to transmit page(s) from the object storage service 606 to the virtual machine 602, such as the error checking of the Transmission Control Protocol/Internet Protocol (TCP/IP) stack. That is, the error-checking component 210 applies an additional layer of validation of received pages at the virtual machine 602. As a result, errors contained in pages transferred to the virtual machine 602 that might otherwise go undetected, e.g., if only the TCP/IP cyclic redundancy check (CRC) were being performed, are found and resolved.

The mounting engine 202 may send that portion, e.g., one or more blocks, of the received page that was requested by the FUSE_1 mounted to the hidden mount point 709 to FUSE_1, as indicated at interaction 730. The FUSE_1 at the hidden mount point 709 may forward a copy of the portion, e.g., the one or more blocks, of the page that was requested to the mounting engine 204, as indicated at interaction 732. The mounting engine 204 may extract, e.g., decompress, the portion of the received page. Now that it has the necessary information, the mounting engine 204 may initialize the non-hidden mount point 711 (FUSE_2), as indicated at interaction 734. As described, the compressed file system archive 500 may be a squashfs archive. In some embodiments, the file system mounting engine 204 may include a tool or utility that enables mounting of a squashfs archive, such as the squashfuse tool. The file system mounting engine 204 may utilize the following command from the squashfuse tool:

squashfuse ARCHIVE MOUNTPOINT
    -oallow_other in order to mount the archive as a root and, by virtue of the -oallow_other option, to allow non-root users to access the app. Nonetheless, in other embodiments, the archive does not need to be mounted as root, and thus the allow_other option would not be required.

The non-hidden mount point 711 (FUSE_2) may report to the mounting engine 204 that the mount point has been initialized, as indicated at interaction 736. The mounting engine 204 may report to the coordinating agent 206 that the installation directory has been mounted, as indicated at interaction 738. The app streaming system 200 may report to the user 104 that the app 112 has been installed at the virtual machine 602, as indicated at interaction 740. For example, the app streaming system 200 may present a message such as 'Installation complete' and may provide an icon for opening the app 112 on a desktop at the laptop computer 102 that represents the virtual machine 602.

If the regular, full installation of the application includes registry entries, then the coordinating agent 206 may make these registry entries at the virtual machine 602. For example, the creator or provider of the app 112 may create a post-installation script that adds entries to the system registry at the virtual machine 602, modifies the system path at the virtual machine 602, for example to include the app 112 to permit the app 112 to be executed from the command line without having to enter the complete path to the binary or executable of the app 112, etc. The app creator or provider may include the post-installation script in the compressed archive. The coordinating agent 206 may run the post-installation script to complete the mock installation of the app 112 at the virtual machine 602.

Figure 8:
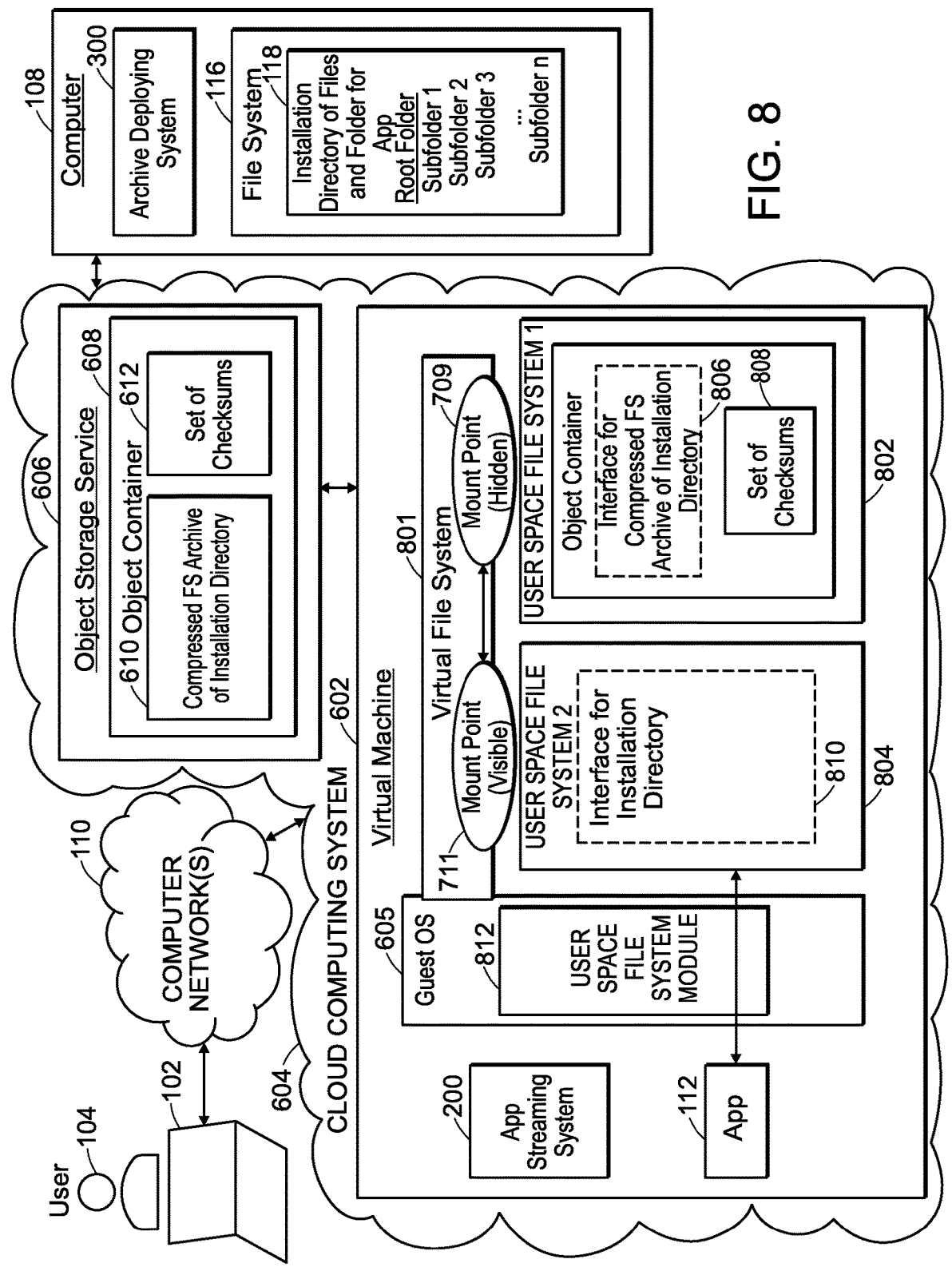
FIG. 8 is a schematic illustration of an example environment in which the systems and methods of the present disclosure may operate in accordance with one or more embodiments.

FIG. 8 is a schematic illustration of an example environment 800 for the systems and methods of the present disclosure following the installation of the app 112 at the virtual machine 602 in accordance with one or more embodiments. The environment 800 includes the data processing device 102 operated by the user 104, the computer 108, and the virtual machine 602 and the object storage service 606 of the cloud computing system 604. With the app 112 installed, the virtual machine 602 now includes two user space file systems identified as FUSE_1 802 and FUSE_2 804, which may be mounted to a virtual file system 801 at the virtual machine 602. As described, the FUSE_1 802 may be mounted to the hidden mount point 709 as created by the mounting engine 202. The FUSE_1 802 may represent or provide an interface for the compressed file system archive as indicated in dashed line at 806. Also included on the FUSE_1 802 is the set of checksums as indicated at 808 computed for the pages of the compressed file system archive 500 stored at the storage object 610. The FUSE_2 804 may be mounted to the visible mount point 711 as created by the mounting engine 204. The FUSE_2 804 may represent or provide an interface for the installation directory as indicated in dashed line at 810. The guest OS 605 may include a user space file system module 812 that interfaces with the FUSE_1 802 and the FUSE_2 804. The user space file system module 812 may be part of the kernel of the guest OS 605 or it may be installed to the guest OS 605.

Even though the user is notified that the app 112 is installed on the virtual machine 602, a native installation of the app 112 at the virtual machine 602 has not been performed. For example, an installer may not have been run at the virtual machine 602. Instead, the app streaming system 200 performed a stream-installation of the app 112 at the virtual machine 602. No files or other data from the installation directory 118 are as yet loaded at the virtual machine 602. Instead, only the superblock section 502 of the compressed FS archive 500 is loaded at the virtual machine 602. As described, the superblock section 502 indicates the locations of the files from installation directory 118 in the compressed FS archive 500. From the perspective of the user 104, however, the app 112 appears installed at the virtual machine 602, and the user 104 may now run and interact with the app 112. For example, the user 104 may open, e.g., execute, the app 112.

Figure 9:
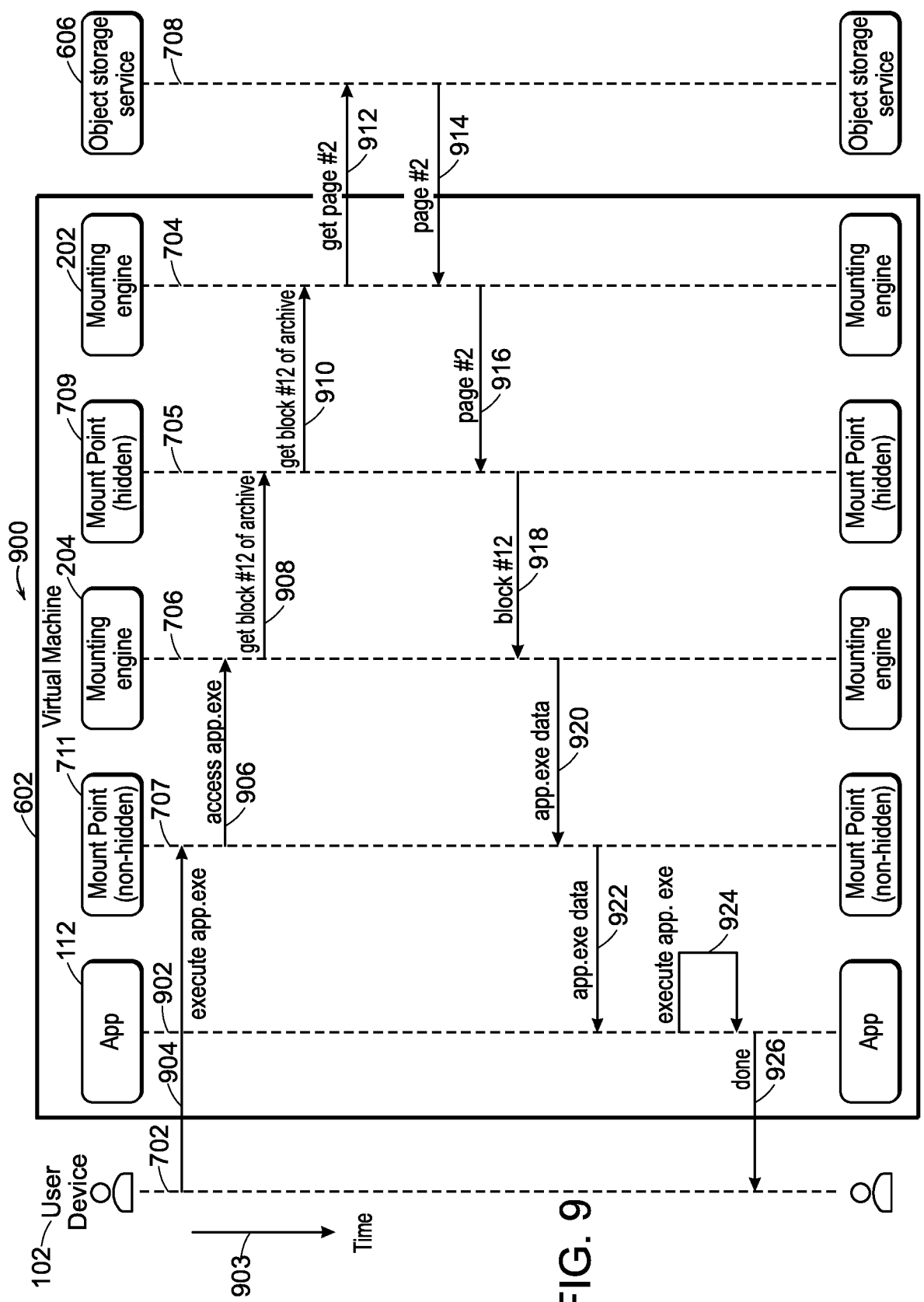
FIG. 9 is a sequence diagram in accordance with one or more embodiments.

FIG. 9 is a sequence diagram 900 illustrating the interactions in response to the user 104 executing the app 112 installed on the virtual machine 602 in accordance with one or more embodiments. The sequence diagram 900 may include the lifelines 702 and 704-708 representing the user 104, the storage container mounting engine 202, the hidden mount point 709 (FUSE_1 802), the file system mounting engine 204, the visible mount point 711 (FUSE_2 804), and the object storage service 606, respectively. In addition, the sequence diagram 900 includes a lifeline 902 for the app 112. The sequence diagram 900 illustrates the interactions among processes over time as indicated by time arrow 903.

The native installation directory 118 may include a binary or executable, e.g., app.exe. To execute the app 112, the user 104 may direct the virtual machine 602 to execute this binary or executable. In response, a request for the app.exe file may be made to the non-hidden mount point 711 (FUSE_2 804), as indicated by interaction 904. For example, the user space file system module 812 of the guest OS 605 is configured to access this file, app.exe, via the visible mount point 711 for the interface to the installation directory 810 at the FUSE_2 804, and may issue a call to get this file from the FUSE_2 804. The FUSE_2 814, however, does not have this file as it is only an interface for the installation directory for the app 112. The FUSE_2 814 is configured to request this file from the file system mounting engine 204, as indicated at interaction 906. The file system mounting engine 204 determines that the requested file is at a particular block, e.g., block #12. The file system mounting engine 204 may determine which block or blocks contain the requested file by accessing the inode for the requested file from the inode table 508 of the compressed archive 500. The inode for the file contains information for determining the block or blocks containing the requested file. The file system mounting engine 204 is configured to get the requested file from FUSE_1 mounted at the hidden mount point 709. Accordingly, the file system mounting engine 204 requests block #12 from FUSE_1 mounted at the hidden mount point 709, as indicated at interaction 908. FUSE_1 802, however, only provides an interface for the compressed archive 500. The FUSE_1 802 mounted at the hidden mount point 709 (FUSE_1 802) is configured to request this block from the storage container mounting engine 202, as indicated at interaction 910.

The paging component 208 of the storage container mounting engine 202 determines which page of the compressed archive 500 includes the requested block, e.g., block #12. Suppose the storage container mounting engine 202 determines that the requested block is included in page #2.

Figure 10:
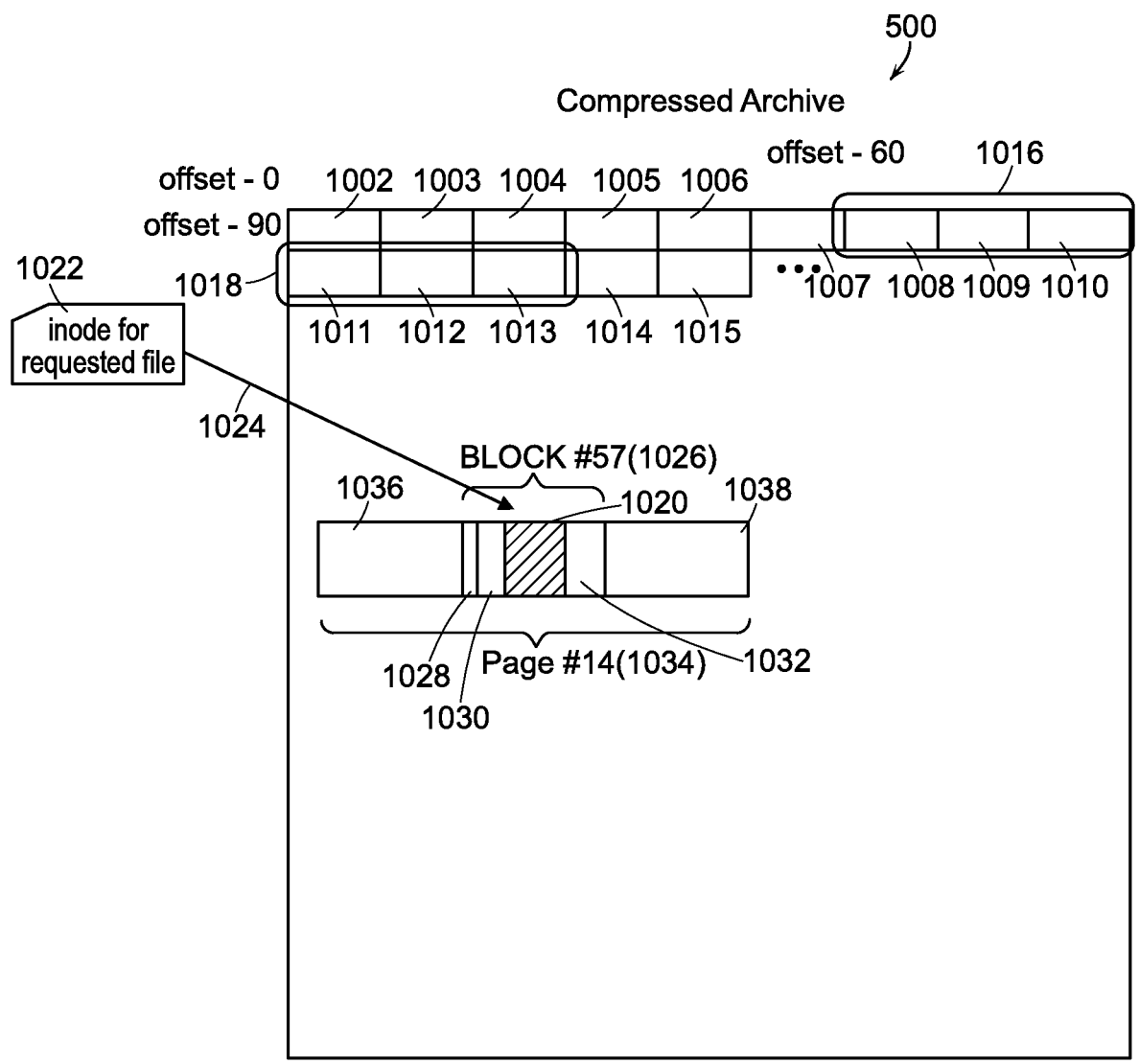
FIG. 10 is a schematic representation of a detail from a compressed archive in accordance with one or more embodiments.

FIG. 10 is a schematic representation of a detail from the compressed archive 500 or a portion thereof illustrating an example of locating a requested file in accordance with one or more embodiments. As described, the archive deploying system 300 may create the compressed archive 500 by reading files from the installation directory 118, compressing the data contained in those files and storing the compressed data in one or more sequential data blocks indicated at 1002-1015 and so on. The archive deploying system 300 also creates inodes that contain information for locating the compressed files in the datablocks & fragments section 506 and includes these inodes in the inode table section 508. In some embodiments, the archive deploying system 300 may partition, e.g., logically, the compressed archive 500 into pages. The pages may be identified by offsets through the compressed archive 500 and have fixed sizes, e.g., every 30 MB for example may be a page. The datablocks containing compressed file data are thus associated with pages. For example, datablocks 1008-1010 are associated with page 1016, which begins at offset 60 MB in the compressed archive 500. Datablocks 1011-1013 are associated with page 1018, which begins at offset 90 MB. To access a requested file in the compressed archive 500, such as file 1020 indicated by the hashing pattern, the file directory mounting engine 204 may access the inode, e.g., inode 1022, for the file 1020. The inode 1022 includes information for locating the file 1020 in the compressed archive 500, as illustrated by arrow 1024. For example, the inode 1022 may include indicating that the file 1020 starts at byte offset 12,000,000 in the compressed archive 500 and has size of 262,144 bytes. The file directory mounting engine 204 can use the fixed size of the datablocks, e.g., datablocks 1002-1015 and so on, of the compressed archive 500 to determine the byte offset of the block, e.g., block #57 indicated at 1026, within the compressed archive 500 that includes the file 1020. As illustrated, the block 1026 may include other files in addition to the requested file 1020, such as files 1028, 1030, and 1032. If the file 1020 were spread across multiple blocks, the file directory mounting engine 204 may determine the sequential set of blocks containing the compressed data of the requested file.

In response to receive the request for block #57 indicated at 1026, the paging component 208 of the object container mounting engine 204 may use the fixed size of the pages, e.g., pages 1016, 1018, and so on, to determine which page contains the requested block. For example, the paging component 208 may determine that the block 1026 being requested is included in page #14 indicated at 1034 of the compressed archive 500. The identified page 1034 may include other blocks in addition to the block 1026, such as blocks 1036 and 1038.

After determining which page contains the requested block, the storage container mounting engine 202 may first check whether the requested page, block, and/or file is already in its cache 212. If so, the storage container mounting engine 202 may provide the requested page, block, and/or file from its cache 212. Assuming the storage container mounting engine 202 does not have the requested page, block, and/or file in its cache 212, it may issue a request to the object storage service 606 for page #2 of the compressed file system archive file 500 included in the storage object 610, as indicated at interaction 912.

The object storage service 606 may return the requested page to the mounting engine 202, as indicated at interaction 914. The error-checking component 210 of the mounting engine 202 may use the checksum generated for the requested page to check its validity. If the received page fails the error-checking test, the mounting engine 202 may request that it be resent. The mounting engine 202 may store the received page in its cache 212. The mounting engine 202 may extract the requested block from the received page, which may include multiple blocks, and provide the requested block to the FUSE_1 802 mounted at the hidden mount point 709, as indicated at interaction 916. The FUSE_1 802 may provide the block to the file system mounting engine 204, as indicated at interaction 918. The file system mounting engine 204 may decompress the block and extract the requested file from the decompressed block.

For example, as noted in the description of FIG. 10, a given block may contain multiple files.

The file system mounting engine 204 then provides the requested file to the FUSE_2 804 mounted to the non-hidden mount point 711, as indicated at interaction 920. The requested file, e.g., app.exe, may not be stored at the FUSE_2 804, which may only represent an interface to the installation directory, and may not include any files. Because the requested file is an executable, the guest OS 605 may initialize a process or thread for running the executable, as indicated by interaction 922, which illustrates the FUSE_2 804 mounted at the non-hidden mount point 711 providing the requested file, app.exe, to the app 112, and interaction 924, which indicates execution of the executable file by the app 112. The app 112 may indicate to the user 104 that the file is executing, as indicated at interaction 926.

If the app 112 needs to access data from another file, e.g., during execution of the app.exe file, the app 112 may request this new file from the FUSE_2 804 mounted at the non-hidden mount point 711, and the sequence of interactions 906-922 may be repeated to access the newly requested file.

Similarly, if, in response to interaction with the app 112 by the user 104, the app needs to access another file or just a portion of a file, the app 112 may request this other file or portion thereof from the FUSE_2 804 mounted at the non-hidden mount point 711, and the sequence of interactions 906-922 may be repeated to access this other file or file portion. When an executable file is executed by an operating system, the operating system may not load the entire contents of the file into memory immediately. Instead, the operating system may lazy-load the file into memory, such that regions or portions of the executable file are only loaded from disk as needed. If a region or portion of the executable file is never used, the operating system may never load it from disk into memory. In that case, the operating system may never request a particular region or portion of the executable file. In some embodiments, the app streaming system 200 may only retrieve and serve the region or portion of an executable file requested by the operating system, instead of retrieving the entire file. For example, the block or blocks containing the requested region or portion of the file may be identified, and the page containing the block or blocks may be retrieved from the object storage service 606. Depending on the requests made by the operating system, the app streaming system 200 may never retrieve the entire file. It should be understood that lazy-loading may be applied to other files besides executables. Suppose, for example, a text file, such as a help file, is spread across multiple pages of the compressed archive. Suppose further that the operating system, in response to a user request, requests the first ten words of this text file. The app streaming system 200 may retrieve just the one page containing that region or portion, e.g., the first ten words, of the text file, instead of retrieving all of the pages containing the entire text file. The request may thus be serviced with a single network transfer.

In addition, the user 104 through the laptop 102 may request to view all or part of the installation directory for the app 112 at the FUSE_2 810 at the virtual machine 602. In response to such requests, the app streaming system 200 may utilize the described process to retrieve information from the compressed archive 500 at the object container 608 to present the installation directory to the user 104. For example, the app streaming system 200 may retrieve metadata from the compressed archive 500 indicating the files and folders of the hierarchical directory and present that information as though such a hierarchical directory were installed at the FUSE_2 810. However, as described, the FUSE_1 802 and the mount point 709 may be hidden from the user 104. The FUSE_1 802 and the mount point 709 may be hidden for example to avoid confusing the user 104 and to make it appear from the perspective of the user 104 as though the app 112 has been installed at the virtual machine 602, instead of being streamed to the virtual machine 602.

The mounting engine 202 may evict pages from the cache 212 for example to maintain the cache size at a predetermined level or in response to the cache exceeding a predetermined threshold. The mounting engine 202 may apply a cache eviction policy, such as Least Recently Used (LRU), First In First Out (FIFO), etc., to evict pages from the cache 212.

In some embodiments, the app streaming system 200 may cache one or more sections or pages of the compressed archive in advance of requests by the user device 102 or the application 112. For example, the creator or provider of the 112 may learn or be informed that a particular user or a user associated with a particular organization often access certain portions of the application 112, such as particular tools, help files, utilities, etc. The app streaming system 200 may be configured to prefetch the sections or pages of the compressed archive containing these often used portions of the application 112 before any request for them, and store them in the cache 212.

In some embodiments, the app streaming system 200 may stream one or more datasets to the computing resource 106 rather than or in addition to streaming an installation directory of an application. For example, the user device 102 and/or an application on the computing resource 106 may utilize one or more data elements contained in a dataset. Instead of loading the entire dataset at the computing resource 106, e.g., all of the data elements, requested data elements of the dataset may be streamed to the computing resource 106 using the described systems and methods.

In some embodiments, a cloud service provider may provide virtual machines and/or object storage services in regions that may be independent of each other. In addition, the cloud service provider may charge for data transfers between resources in two regions but not for data transfers between resources in the same region. In some embodiments, the archive deploying system 300 may establish compressed archives and checksums in multiple regions. In addition, the app streaming system 200 running at a virtual machine in a given region may be configured to access an object container at an object storage service in that same region to stream an application to the virtual machine to reduce costs, e.g., to a user 104.

As shown in some of the illustrative embodiments, the client device 102 may be different and/or remote from the computing resource 106 and/or the virtual machine 602. In some embodiments, the client device 102 may be omitted, and the user 104 may directly operate the computing resource 106, which may be a computer system, to which the app streaming system 200 streams the app 112.

Also, in some embodiments, the archive deploying system 300 may create a disk image or archive of the installation directory 118 that is not compressed. The disk image or archive may be stored as a storage object in an object container. The app streaming system 200 may retrieve pages and/or blocks containing requested files or portions thereof from the archive. The app streaming system 200 may serve the requested files or portions thereof to the app 112 and/or the operating system 114 without having to decompress them.

As described, a request to install an application at a virtual machine may identify the application to be installed, e.g., the CATIA CAD/CAM/CAE software system, and when there are multiple versions of the application, the particular the version to be installed, e.g., release R2018 (R28). The request may also include user credentials, such as a login-password pair authorization, a license number, etc. The app streaming system 200 may include or be in communication with an authentication utility that may check whether the user is authorized to install the requested application based the user credentials, e.g., before the streaming installation of the application. If the user lacks authorization, the app streaming system 200 may cancel the streaming installation.

In some embodiments, the creator or provider of the application may install various versions of the application at the computer 108, such as releases R2014, R2015, R2016, R2017, R2018, R2019, etc. The archive deploying system 300 may create a compressed archive for each such release, which may then be stored as a storage object in a storage container along with a storage object containing checksums computed for pages of that compressed archive. In response to a user request to install a particular version of the application, the app streaming system 200 may access the particular storage container containing that version and perform a streaming installation from that storage container. In some embodiments, a user device 102 may request that multiple versions of the same application be installed at the virtual machine 602, e.g., versions R2015 and R2018. The app streaming system 200 may access the storage containers containing the requested versions and stream them to the virtual machine 602. In some embodiments, a user device 102 may request that multiple applications be installed at the virtual machine 602 each of which would ordinarily consume large storage resources of the virtual machine 602, if a standard installation were performed. The app streaming system 200 may stream each application to the virtual machine 602, while reducing the storage footprint required at the virtual machine to run, e.g., execute, the multiple applications.

The creator or provider may also create archives of installations of a given release of an application on different platforms. For example, archives may be created for release R2019 for Windows, release R2019 for Linux, and release R2019 for macOS.

In addition to different versions, some applications, such as technical and/or engineering applications may include a plurality of tools that may optionally be included in an installation of the application program. The various tools may be directed to particular uses of the application. For example, the MATLAB programming environment the Parallel Computing Toolbox, the Deep Learning Toolbox, the Partial Differential Equation Toolbox, etc. In some embodiments, the application creator may create installations of the application with various combinations of the optional toolboxes at the computer 108 or at another data processing device. The archive deploying system 300 may create compressed archives of the application with the various toolbox combinations. In response to a request from the client device 102 to install the application with a particular combination of toolboxes, the app streaming system 200 may identify the storage container that contains the application with the requested combination of toolboxes. The app streaming system 200 may stream the application with the requested combination of toolboxes to the virtual machine 602. In other embodiments, the application creator may create an installation of the application with all available tools and/or toolboxes. If a user has only purchased a license to a subset of the available tools or toolboxes, the app streaming system 200 may block efforts to access a file from a tool or toolbox outside of the client's license.

Figure 11:
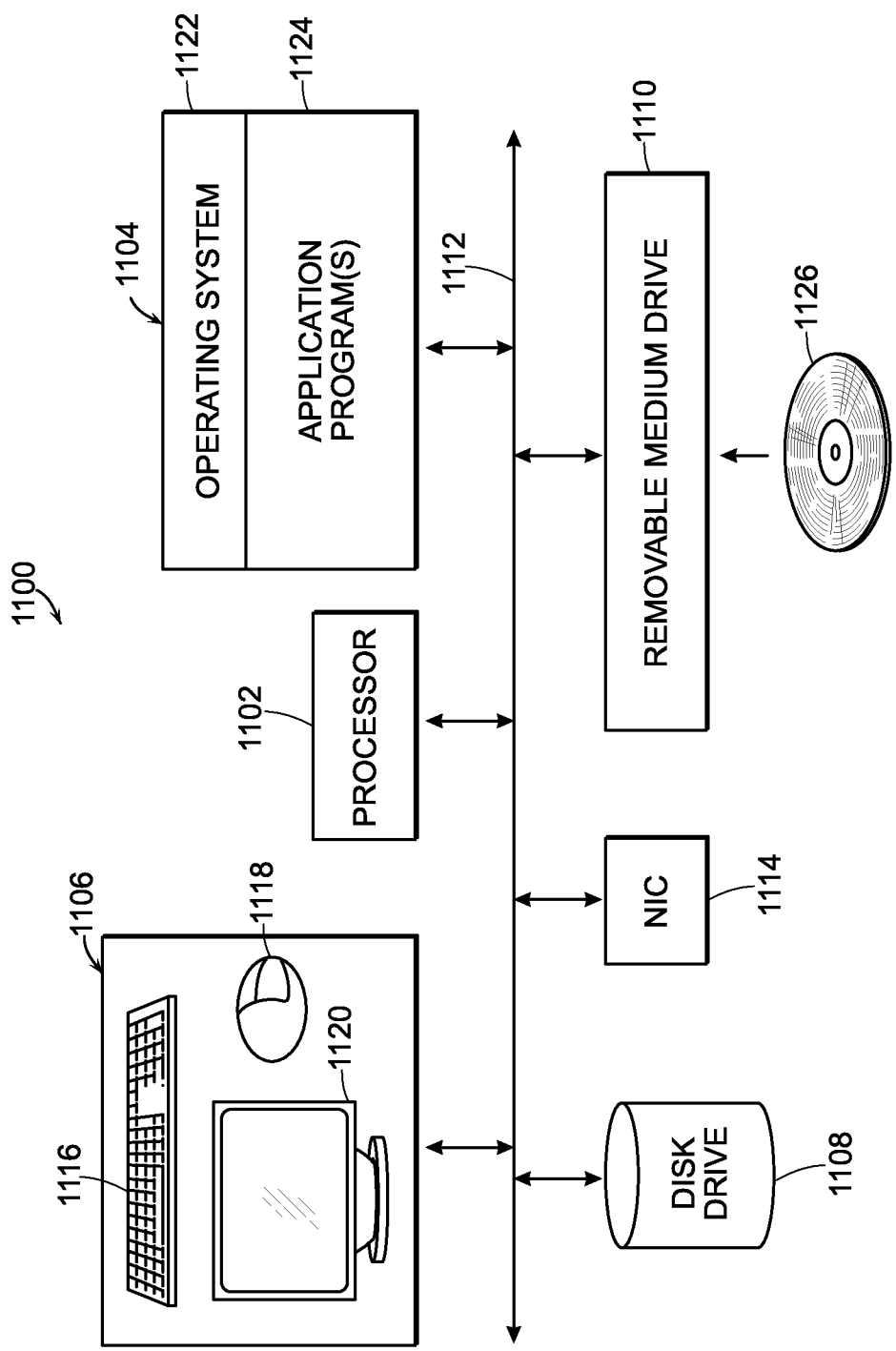
FIG. 11 is a schematic illustration of an example data processing device in accordance with one or more embodiments.

FIG. 11 is a schematic illustration of an example computer or data processing device 1100, such as the laptop computer 102, the computer 108, and/or a computer as emulated by the virtual machine 602 in accordance with one or more embodiments. The data processing device 1100 may include one or more processing elements, such as a processor 1102, a main memory 1104, user input/output (I/O) 1106, a persistent data storage unit, such as a disk drive 1108, and a removable medium drive 1110 that are interconnected by a system bus 1112. The data processing device 1100 may also include a communication unit, such as a network interface card (NIC) 1114. The user I/O 1106 may include a keyboard 1116, a pointing device, such as a mouse 1118, and a display 1120. Other user I/O 1106 components include voice or speech command systems, touchpads and touchscreens, printers, projectors, etc. Exemplary processors include single or multi-core Central Processing Units (CPUs), Graphics Processing Units (GPUs), Field Programmable Gate Arrays (FPGAs), Application Specific Integrated Circuits (ASICs), microprocessors, microcontrollers, etc.

The main memory 1104, which may be a Random Access Memory (RAM), may store a plurality of program libraries or modules, such as an operating system and/or guest operating system 1122, and one or more application programs that interface to the operating system 1122, as indicated at 1124. Exemplary application programs include the app 112, the app streaming system 200, the archive deploying system 300, and a cloud agent running on the laptop computer 102, among others.

The removable medium drive 1110 may accept and read a computer readable medium 1126, such as a CD, DVD, floppy disk, solid state drive, tape, flash memory or other non-transitory medium. The removable medium drive 1110 may also write to the computer readable medium 1126.

Suitable computer systems include personal computers (PCs), workstations, servers, laptops, tablets, palm computers, smart phones, electronic readers, and other portable computing devices, etc. Nonetheless, those skilled in the art will understand that the computer system 1100 of FIG. 11 is intended for illustrative purposes only, and that the present invention may be used with other computer, data processing, or computational systems or devices. The present invention may also be used in a computer network, e.g., client-server, architecture, or a public and/or private cloud computing arrangement. For example, the simulation environment 200 may be hosted on one or more cloud servers or devices, and accessed by remote clients through a web portal or an application hosting system, such as the Remote Desktop Connection tool from Microsoft Corp.

Suitable operating systems 1122 include the Windows series of operating systems from Microsoft Corp. of Redmond, Wash., the Android and Chrome OS operating systems from Google Inc. of Mountain View, Calif., the Linux operating system, the MAC OS® series of operating systems from Apple Inc. of Cupertino, Calif., and the UNIX® series of operating systems, among others. The operating system 1122 may provide services or functions for applications or modules, such as allocating memory, organizing data objects or files according to a file system, prioritizing requests, managing I/O, etc. As noted, the operating system 1122 may be a guest operating system running on a virtual machine, which may be provided by the data processing system 1100.

The foregoing description of embodiments is intended to provide illustration and description, but is not intended to be exhaustive or to limit the disclosure to the precise form disclosed. Modifications and variations are possible in light of the above teachings or may be acquired from a practice of the disclosure. For example, while a series of acts has been described above with respect to the flow diagrams, the order of the acts may be modified in other implementations. In addition, the acts, operations, and steps may be performed by additional or other modules or entities, which may be combined or separated to form other modules or entities. Further, non-dependent acts may be performed in parallel. Also, the term "user", as used herein, is intended to be broadly interpreted to include, for example, a computer or data processing system or a human user of a computer or data processing system, unless otherwise stated.

Further, certain embodiments of the disclosure may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system, such as system 1600. The computer-executable instructions may include instructions that implement one or more embodiments of the disclosure. The tangible non-transitory computer-readable storage media may be volatile or non-volatile and may include, for example, flash memories, dynamic memories, removable disks, and non-removable disks.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present disclosure. It will be apparent, however, that other variations and modifications may be made to the described embodiments, with the attainment of some or all of their advantages. For example, the checksums on the pages may be omitted. Therefore, it is the object of the appended claims to cover all such variations and modifications as come within the true spirit and scope of the disclosure.

What is claimed is:

1. A computer-implemented method for streaming an application program to a computing resource accessible by a client device different from the computing resource, the method comprising:
   storing a compressed archive of an installation directory created for the application program as a first storage object in an object container, the installation directory containing program files utilized during execution of the application program;
   partitioning the compressed archive into a sequence of sections;
   calculating checksums for the sections of the compressed archive;
   storing the checksums as a second storage object in the object container;
   creating a first mount point at a file system at the computing resource;
   mounting an interface for the object container at the first mount point, wherein the interface for the object container mounted to the first mount point includes the second storage object containing the checksums, but is free from including compressed versions of the program files;
   creating a second mount point at the file system at the computing resource;
   mounting an interface for the installation directory at the second mount point, wherein the interface for the installation directory is free from including the program files contained in the installation directory created for the application program, wherein the second mount point is accessible by the client device;
   in response to a request to access at least a portion of a given program file from the installation directory, when the application program is executed at the computing resource, determining which section of the sections includes a compressed version of the at least a portion of the given program file;
   transferring the section determined to include the compressed version of the at least a portion of the given program file from the object container to the interface for the object container at the first mount point at the computing resource;
   using, at the compute resource, the checksum from the checksums that is associated with the section determined to include the compressed version of the at least a portion of the given program file to validate the section;
   extracting, at the compute resource, the compressed version of the at least a portion of the given program file from the section transferred to the interface for the object container at the first mount point;
   decompressing the compressed version of the at least a portion of the given program file, at the computing resource, to recover the given program file; and
   providing the given program file to the interface for the installation directory at the second mount point at the computing resource;
   utilizing the at least a portion of the given program file during the execution of the application program at the computing resource.

2. The computing-implemented method of claim 1 further comprising:
   caching the section determined to include the compressed version of the given program file at a cache at the computing resource; and
   utilizing the section stored at the cache to service a new request for the given program file or for another file included in the section stored in the cache.

3. The computer-implemented method of claim 1 wherein the first mount point is not accessible from the client device.

4. The computer-implemented method of claim 1 wherein the object container is stored at an object storage service.

5. The computer-implemented method of claim 1 wherein the computing resource is a temporary compute instance provided by a cloud-based computing service.

6. The computer-implemented method of claim 5 wherein the client device requests the cloud-based computing service to launch the compute instance.

7. The computer-implemented method of claim 1 wherein the installation directory is created at a computer separate from the client device and from the computing resource by installing the application program at the computer.

8. The computer-implemented method of claim 7 wherein the installation directory requires greater than 10 Gigabytes (GB) of storage at the computer.

9. The computer-implemented method of claim 1 wherein the compressed versions of the program files are stored in blocks of the compressed archive, the method further comprising:
- determining at the computing resource one or more of the blocks of the compressed archive that include the given program file; and
- determining which section of the compressed archive includes the one or more of the blocks that include the given program file.

10. The computer-implemented method of claim 9 further comprising:
- storing at the computing resource information indicating locations of the compressed versions of the program files in the compressed archive.

11. The computer-implemented method of claim 10 wherein the information includes an inode table containing inodes and the determining at the computing resource the one or more of the blocks of the compressed archive that include the given program file include:
- accessing from the inode table a given inode that is associated with the given program file, wherein the given inode identifies the one or more of the blocks of the compressed archive that include the given program file.

12. The computer-implemented method of claim 9 wherein the sections are associated with offsets in the compressed archive, the offsets indicate sizes of the sections of the compressed archive and the determining which section of the compressed archive includes the blocks that include the given program file is based on the offsets associated with the sections of the compressed archive.

13. The computer-implemented method of claim 12 wherein all of the sections of the compressed archive have the same size.

14. The computer-implemented method of claim 1 wherein the interface for the object container is included in a first Filesystem in User Space file system mounted to the first mount point.

15. The computer-implemented method of claim 14 wherein the interface for the installation directory is included in a second Filesystem in User Space file system mounted to the second mount point.

16. One more non-transitory computer-readable media, having stored thereon instructions that when executed by a computing device, cause the computing device to perform operations comprising:
- for an object container including a first storage object and a second storage object, the first storage object including an archive of a dataset containing data elements or an installation directory created for an application program, the installation directory containing program files utilized during execution of the application program, and the second storage object including verification data for sections of the archive, creating a first mount point at a file system at a computing resource;
- mounting an interface for an object container at the first mount point, wherein the interface for the object container mounted to the first mount point includes the second storage object containing the verification data, but is free from including the data elements of the dataset or the program files from the archive;
- creating a second mount point at the file system at the computing resource;
- mounting an interface for the dataset or the installation directory at the second mount point, wherein the interface for the dataset or the installation directory is free from including the data elements contained in the dataset or the program files contained in the installation directory created for the application program;
- in response to a request to access at least a portion of a given data element from the dataset or a given program file from the installation directory, when the application program is executed at the computing resource, determining which section of the sections includes the at least a portion of the given data element or the given program file;
- transferring the section determined to include the at least a portion of the given data element or the given program file from the object container to the interface for the object container at the first mount point at the computing resource;
- using, at the compute resource, a portion of the verification data that is associated with the section determined to include the at least a portion of the given data element or the given program file to validate the section; and
- utilizing the at least a portion of the given data element of the dataset or the given program file of the application program at the computing resource.

17. The one more non-transitory computer-readable media of claim 16 wherein the archive is a compressed version of the dataset or the installation directory, the operations further comprising:
- extracting, at the computing resource, a compressed version of the at least a portion of the given data element or the given program file from the section transferred to the interface for the object container at the first mount point;
- decompressing the compressed version of the at least a portion of the given data element or the given program file, at the computing resource, to recover the at least a portion of the given data element or the given program file; and
- providing the at least a portion of the given data element or the given program file to the interface for the installation directory at the second mount point at the computing resource.

18. The one more non-transitory computer-readable media of claim 16 wherein the computing resource is a temporary compute resource hosted by a cloud service and the application program executing at the computing resource is accessible by a client device remote from the computing resource.

19. The one or more non-transitory computer-readable media of claim 16 wherein the dataset or the application program is utilized by a user having user credentials, the operations further comprising:
- determining whether the user is authorized to install the dataset or the application program based the user credentials.

20. The one or more non-transitory computer-readable media of claim 16 wherein the operations further comprise:
- prefetching one or more of the data elements of the dataset or one or more of the program files of the application program in advance of a request for the one or more data elements or the one or more program files; and
- caching the one or more of the data elements or the one or more of the program files.

21. A computer-implemented method comprising:
- for an object container including a first storage object and a second storage object, the first storage object including an archive of a dataset containing data elements or an installation directory created for an application program, the installation directory containing program files utilized during execution of the application program, and the second storage object including verification data for sections of the archive, creating a first mount point at a file system at a computing resource;
mounting, by one or more processors, an interface for an object container at the first mount point, wherein the interface for the object container mounted to the first mount point includes the second storage object containing the verification data, but is free from including the data elements of the dataset or the program files from the archive;
creating a second mount point at the file system at the computing resource;
mounting an interface for the dataset or the installation directory at the second mount point, wherein the interface for the dataset or the installation directory is free from including the data elements contained in the dataset or the program files contained in the installation directory created for the application program;
in response to a request to access at least a portion of a given data element from the dataset or a given program file from the installation directory, when the application program is executed at the computing resource, determining, by the one or more processors, which section of the sections includes the at least a portion of the given data element or the given program file;
transferring the section determined to include the at least a portion of the given data element or the given program file from the object container to the interface for the object container at the first mount point at the computing resource;
using, at the compute resource, a portion of the verification data that is associated with the section determined to include the at least a portion of the given data element or the given program file to validate the section; and
utilizing the at least a portion of the given data element of the dataset or the given program file of the application program at the computing resource.

22. An apparatus comprising:
one or more data storage devices storing an object container including a first storage object and a second storage object, the first storage object including an archive of a dataset containing data elements or an installation directory created for an application program, the installation directory containing program files utilized during execution of the application program, and the second storage object including verification data for sections of the archive, creating a first mount point at a file system at a computing resource; and
one or more processors configured to:
mount an interface for an object container at the first mount point, wherein the interface for the object container mounted to the first mount point includes the second storage object containing the verification data, but is free from including the data elements of the dataset or the program files from the archive;
create a second mount point at the file system at the computing resource;
mount an interface for the dataset or the installation directory at the second mount point, wherein the interface for the dataset or the installation directory is free from including the data elements contained in the dataset or the program files contained in the installation directory created for the application program;
in response to a request to access at least a portion of a given data element from the dataset or a given program file from the installation directory, when the application program is executed at the computing resource, determine which section of the sections includes the at least a portion of the given data element or the given program file;
transfer the section determined to include the at least a portion of the given data element or the given program file from the object container to the interface for the object container at the first mount point at the computing resource;
use, at the compute resource, a portion of the verification data that is associated with the section determined to include the at least a portion of the given data element or the given program file to validate the section; and
utilize the at least a portion of the given data element of the dataset or the given program file of the application program at the computing resource.

\* \* \* \* \*